(12) United States Patent
Pieczul et al.

(10) Patent No.: US 11,444,837 B1
(45) Date of Patent: Sep. 13, 2022

(54) TECHNIQUES FOR VERIFYING NETWORK POLICIES IN CONTAINER FRAMEWORKS

(71) Applicant: Oracle International Corporation, Redwood Shores, CA (US)

(72) Inventors: Olgierd Stanislaw Pieczul, Dublin (IE); Subaru Arthur Ueno, Seattle, WA (US); Robert Graham Clark, Clyde Hill, WA (US)

(73) Assignee: Oracle International Corporation, Redwood Shores, CA (US)

( * ) Notice: Subject to any disclaimer, the term of this patent is extended or adjusted under 35 U.S.C. 154(b) by 72 days.

(21) Appl. No.: 17/187,631

(22) Filed: Feb. 26, 2021

(51) Int. Cl.
*G06F 15/173* (2006.01)
*H04L 41/0893* (2022.01)
*H04L 41/12* (2022.01)

(52) U.S. Cl.
CPC .......... *H04L 41/0893* (2013.01); *H04L 41/12* (2013.01)

(58) Field of Classification Search
CPC ............................ H04L 41/0893; H04L 41/12
See application file for complete search history.

(56) References Cited

U.S. PATENT DOCUMENTS

| 11,102,076 B1 | 8/2021 | Pieczul et al. |
| 2009/0199213 A1 | 8/2009 | Webster et al. |
| 2012/0093160 A1 | 4/2012 | Tonsing et al. |
| 2012/0192246 A1 | 7/2012 | Hanison |
| 2013/0139228 A1 | 5/2013 | Odaira |
| 2019/0020665 A1 | 1/2019 | Surcouf et al. |
| 2019/0208445 A1 | 7/2019 | Klatsky et al. |
| 2019/0289035 A1 | 9/2019 | Ahuja et al. |
| 2020/0021615 A1 | 1/2020 | Wainner et al. |
| 2020/0280576 A1 | 9/2020 | Key et al. |
| 2022/0191099 A1* | 6/2022 | Pieczul ................. H04L 43/062 |

OTHER PUBLICATIONS

U.S. Appl. No. 17/167,591, Notice of Allowance dated May 26, 2021, 8 pages.
U.S. Appl. No. 17/379,923, Non-Final Office Action dated Mar. 14, 2022, 9 pages.
U.S. Appl. No. 17/124,155, First Action Interview Pilot Program Pre-Interview Communication dated Apr. 6, 2022, 4 pages.
U.S. Appl. No. 17/124,155, Notice of Allowance dated May 26, 2022, 11 pages.

(Continued)

*Primary Examiner* — Wing F Chan
*Assistant Examiner* — Joseph R Maniwang
(74) *Attorney, Agent, or Firm* — Kilpatrick Townsend & Stockton LLP

(57) ABSTRACT

Techniques are disclosed for network policy verification system that can obtain a set of connectivity paths of a containerized environment that individually indicate connections between pairs of containers. Identify a first container and a second container of a pair based at least in part on a connectivity path. Determine a network policy corresponding to the connectivity path that indicates an expected result of that particular connection. A connection can be initiated between the two containers. The result may be presented at a user device based at least in part on identifying that the result is different from the expected result indicated by the network policy corresponding to the connectivity path.

20 Claims, 13 Drawing Sheets

(56) References Cited

OTHER PUBLICATIONS

Distributed Tracing FAQ, Istio, Available Online at https://istio.io/latest/faq/distributed-tracing/, Accessed from Internet on: Feb. 15, 2021, 3 pages.
Extensibility, Istio, Available Online at https://istio.io/latest/docs/concepts/wasm/, Accessed from Internet on Feb. 15, 2021, 3 pages.
Observability, Istio, Available Online at https://istio.io/latest/docs/concepts/observability/, Accessed from Internet on: Feb. 15, 2021, 5 pages.
Security, Istio, Available Online at https://istio.io/latest/docs/concepts/security/, Accessed from Internet on Feb. 15, 2021, 19 pages.
Traffic Management, Istio, Available Online at https://istio.io/latest/docs/concepts/traffic-management, Accessed from Internet on: Feb. 15, 2021, 15 pages.
Tufin SecureCloud Solution Brief, Tufin, The Security Policy Company, May 20, 2020, 2 pages.
What is Istio?, Istio, Available Online at https://istio.io/latest/docs/concepts/what-is-istio/, Accessed from Internet on: Feb. 15, 2021, 4 pages.
Moyle, Istion Service Mesh Security Benefits Microservices, Developers, Adaptive Biotechnologies, Available Online at: https://searchcloudsecurity.techtarget.com/tip/Istio-service-mesh-security-benefitsmicroservices-developers, Jun. 17, 2020, 5 pages.
U.S. Appl. No. 17/124,155, Automatically Inferring Software-Defined Network Policies From the Observed Workload in Containerized Environment filed Dec. 16, 2020.
U.S. Appl. No. 17/124,162, Techniques for Generating Network Security Policies for Application Components Deployed in a Computing Environment filed Dec. 16, 2020.
U.S. Appl. No. 17/167,591, Techniques for Network Policies Analysis in Container Frameworks, filed Feb. 4, 2021,.
International Application No. PCT/US2021/035216, International Search Report and the Written Opinion dated Oct. 27, 2021, 12 pages.

\* cited by examiner

400 ↘

| From (zone) | To (zone) |
|---|---|
| - | web |
| - | front |
| front | services |
| services | services |
| services | data |

402

| From (app) | To (app) |
|---|---|
| - | web-app |
| - | api-gateway |
| api-gateway | user-service |
| api-gateway | order-service |
| api-gateway | invoice-service |
| order-service | user-service |
| invoice-service | user-service |
| user-service | database |
| invoice-service | database |
| order-service | database |
| order-service | message-queue |
| invoice-service | message-queue |

404

| From | To |
|---|---|
| - | zone: web |
| - | zone: front |
| zone: front | zone: services |
| zone: services | zone: services |
| zone: services | app: database |
| app: order-service | app: message-queue |
| app: invoice-service | app: message-queue |

TECHNIQUES FOR VERIFYING NETWORK POLICIES IN CONTAINER FRAMEWORKS

BACKGROUND

Container orchestration tools provide a robust framework for managing and deploying containerized applications across a cluster of computing nodes in a computing environment. Examples of these tools include, for instance, Kubernetes, Open Shift, Docker Swarm, and the like. The usage of these tools has dramatically increased in the recent years with the rising popularity of cloud-based services and changes in the design of services/applications from large and monolithic systems to highly distributed and micro-service based systems. In the micro-service based model, an application is built using a large number of small components communicating over a network. Each component can be independently deployed, upgraded, and scaled to a production environment. Software-defined networks are an integral part of the micro-service based model, allowing seamless changes to individual components without disruption. Each time the arrangement of a component within the system changes, the underlying network is reconfigured automatically. Components in such networks typically have dynamically assigned Internet Protocol (IP) addresses that are not stable for a particular component type.

Managing network policies (e.g., network security policies) for these systems is difficult as they often use a number of declarative configurations of network policies that define permitted traffic flows between components. These policies can be defined in a variety of ways by a number of different entities making it common for users to unwittingly specify policies that conflict with each other, or overshadow one another. This is particularly problematic in large systems with multiple groups responsible for parts of the workload. In addition, the label assignment for a component may change independently from the network policies, further complicating the analysis. It is unlikely, given the complexity of the configuration of such systems, that a single entity would manage these policies. Existing techniques to manually verify and/or analyze such policies are tedious, require specialized personnel, and do not scale to the size and complexity of these systems. Thus, manual processing of these network policies is rarely feasible.

BRIEF SUMMARY

Techniques are provided (e.g., a method, a system, non-transitory computer-readable medium storing code or instructions executable by one or more processors) for verifying network security rules/policies of a container framework. Various embodiments are described herein, including methods, systems, non-transitory computer-readable storage media storing programs, code, or instructions executable by one or more processors, and the like.

One embodiment is directed to a method for verifying one or more network security rules, in accordance with at least one embodiment. The method may include obtaining, by a computing device, a set of connectivity paths of a containerized environment. In some embodiments, the set of connectivity paths individually indicate connections between pairs of containers in the containerized environment. The method may further include identifying, by the computing device, a first container and a second container of a pair of containers based at least in part on a connectivity path of the set of connectivity paths. The method may further include determining, by the computing device, a network security policy corresponding to the connectivity path. In some embodiments, the network security policy indicates an expected result of a particular connection between the first container and the second container. The method may further include initializing, by the computing device, a connection from the first container to the second container. The method may further include identifying, by the computing device, a result of the connection. The method may further include causing the result to be presented at a user device based at least in part on identifying that the result is different from the expected result indicated by the network security policy corresponding to the connectivity path.

In some embodiments, the result indicates that the connection was established or that establishing the connection failed. The method may further include identifying a first subset of connectivity paths of the set of connectivity paths as positive paths based at least in part to one or more network policies that individually correspond with a respective connectivity path of the first subset of connectivity paths. In some embodiments, identifying a particular connectivity path as a positive path comprises determining that connection between two containers of the connectivity path is to be allowed based at least in part on a corresponding network security policy. The method may further include generating a second subset of connectivity paths of the set of connectivity paths, the second subset of connectivity paths corresponding to negative paths. The second subset of connectivity paths may be generated based at least in part on identifying the first subset of connectivity paths.

In some embodiments, obtaining the set of connectivity paths further comprises, for at least one connectivity path of the set of connectivity paths monitoring, at run-time, network traffic between two containers of the containerized environment and generating a corresponding connectivity path based at least in part on the monitoring.

In some embodiments, obtaining the set of connectivity paths further comprises, for at least one connectivity path of the set of connectivity paths, obtaining a predefined connectivity path indicating that a specific connection between a specific pair of containers is to be allowed or disallowed.

The method may further include identifying the first container and the second container based at least in part on identifying the first container is associated with a first label and the second container is associated with a second label.

In some embodiments, the first container is one of a plurality of containers associated with the first label, and the method further includes i) initiating an additional connection between at least one other container of the plurality of containers and the second container, ii) identifying, by the computing device, an additional result of the additional connection; and iii) causing the additional result to be presented based at least in part on identifying that the additional result is different from the expected result indicated by the network security policy corresponding to the connectivity path.

Another embodiment is directed to a computing device comprising one or more processors and one or more memories storing computer-executable instructions that, when executed by the one or more processors, cause and/or configure the computing device to perform the method described above.

Another embodiment is directed to a non-transitory computer-readable medium storing computer-executable instructions that, when executed by one or more processors of a computing device, cause the computing device to perform the method described above.

Various embodiments are described herein, including methods, systems, non-transitory computer-readable storage media storing programs, code, or instructions executable by one or more processors, and the like. These illustrative embodiments are mentioned not to limit or define the disclosure, but to provide examples to aid understanding thereof. Additional embodiments are discussed in the Detailed Description, and further description is provided there.

BRIEF DESCRIPTION OF THE DRAWINGS

Various embodiments in accordance with the present disclosure will be described with reference to the drawings, in which:

FIG. 4 depicts various examples of network polices defined by a container-based framework for a containerized application deployed on a cluster of nodes in the container-based framework, in accordance with at least one embodiment.

DETAILED DESCRIPTION

Figure 1:
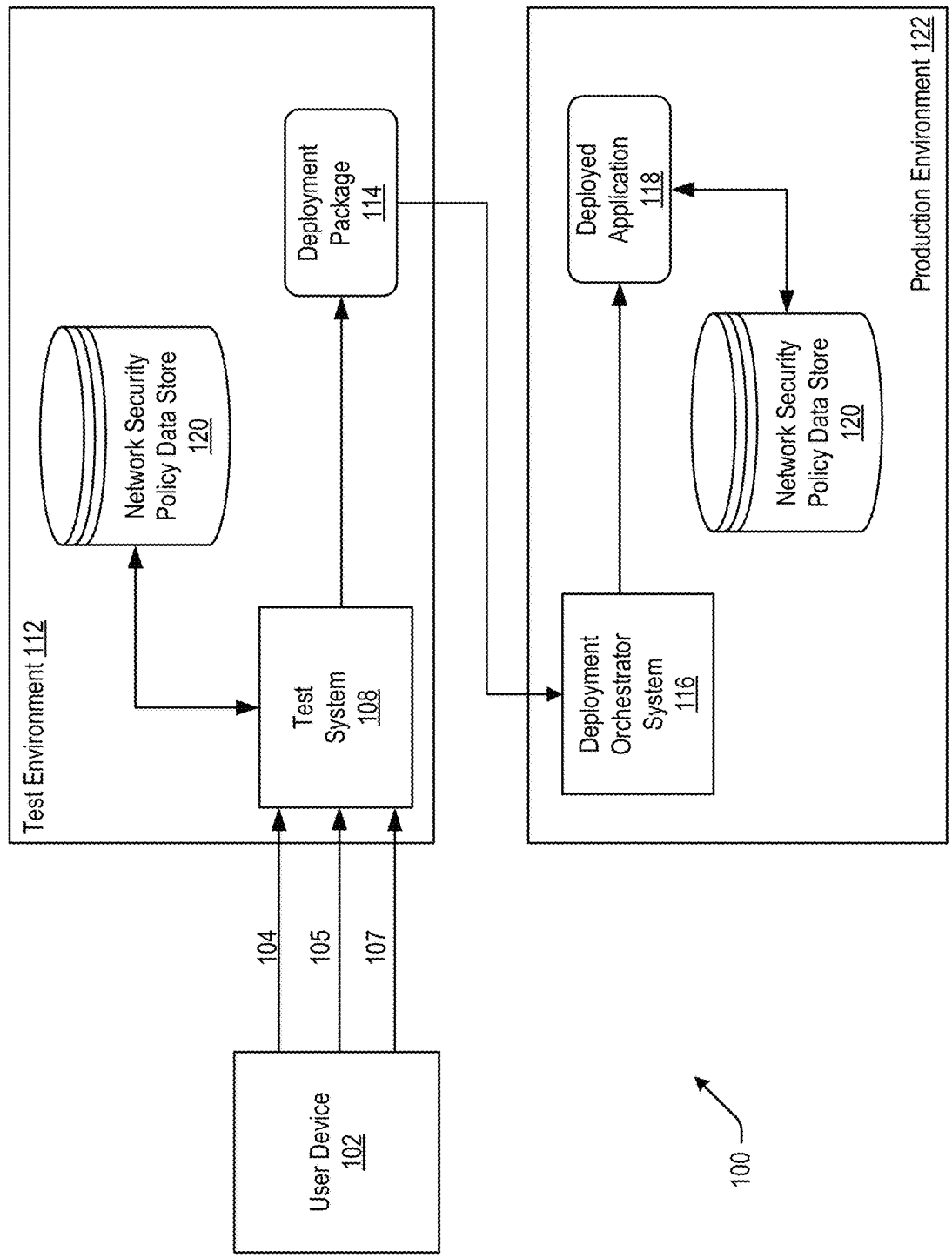
FIG. 1 depicts an example of a computing environment 100 for utilizing network security policies for components of an application deployed in the computing environment, in accordance with at least one embodiment.

In the following description, for the purposes of explanation, specific details are set forth in order to provide a thorough understanding of certain embodiments. However, it will be apparent that various embodiments may be practiced without these specific details. The figures and description are not intended to be restrictive. The word "exemplary" is used herein to mean "serving as an example, instance, or illustration." Any embodiment or design described herein as "exemplary" is not necessarily to be construed as preferred or advantageous over other embodiments or designs.

In certain approaches, software defined networks, used in container orchestration tools often by default, allow communication between all the components within the system. For example, in Kubernetes, Common Network Interface plugins are required to assign an Internet Protocol (IP) address to every component (or pod) in an application and the plugins allow traffic between every pod, regardless of the underlying network used. One approach involves the use of software-based tunneling protocols, such as Virtual Extensible Local Area Network (VXLAN), to provide a flat network that moves traffic seamlessly within and between hosts (physical machines or virtual machines) that provide computing instances to the cluster. While, the primary goal of such a network is to provide connectivity for continuously changing workloads, it does not provide security or isolation of network traffic between the components.

To compensate for the challenges faced by container orchestration tools that use traditional network controls to specify network security policies (referred to as "policies" for brevity) for communication between the components of a containerized application, container orchestration frameworks may provide mechanisms to restrict the traffic within the cluster by specifying a network policy configuration for the entire application and providing it to the cluster's control plane. The policy indirectly addresses the components through metadata associated with these components. For example, in Kubernetes, the policy specification may not use identifiers of pods, but may instead use pod labels and namespaces where multiple pods can share labels and namespaces. As used herein, a "pod" may refer to a set of one or more components of an application that may be processed by the orchestration tool at a time. In some embodiments, a pod may be a minimum unit of composition over which the container orchestrator system applies policy.

In certain approaches, in container-based frameworks such as Kubernetes and OpenShift, network security policies are distributed as a collection of independent objects. These objects have their own lifecycle, can be changed independently, but affect each other and the system (i.e., the containerized application) as a whole. For example, a policy for one object can accidentally overshadow another policy defined for another object. Furthermore, elements that are used to specify the policy, such as component labels, may change independently from the policy itself. It is possible that routine reconfiguration of a component will accidentally affect a network security policy. Additionally, when tasks of component and network security policy management are split between different teams within an organization, the process of defining network policies (e.g., network traffic policies) for individual components by container-based frameworks becomes even more challenging.

Network policy management is particularly challenging with a truly continuous delivery model. In this case, individual components are delivered independently, typically with one change to the system at a time. New components may be delivered very frequently, multiple times a day, and each time they may potentially require a different network policy configuration. In addition, older and newer versions of the same component are often running in in parallel, to facilitate non-disruptive transition during an upgrade, or to provide a gradual change delivery model. In this model, system processing (defined by a portion of processing, groups of users or other means) is gradually directed to newer components. Gradual rollout of changes allows monitoring changes in a real-life environment and their operation under increased load, without risking a full system disruption. In addition, the arrangement of the components may be different in different environments, with different feature sets, regulatory compliance requirements, or customer needs.

Some approaches to verifying the network policies are defined as intended include verifying the workflow with the policies enabled in a test environment. However, the user may not always be able to perform a full integration test before applying a rule, they may not have such environment available, and/or it may be too costly. Sometimes changes have to be deployed as a matter of urgency for example to eliminate a vulnerability. In addition, while integration tests could be good in testing that the required connectivity is allowed (as lack of it will manifest itself as functional regression), they are not particularly suitable for negative testing. The user may have a specific set of connectivity cases that they want to ensure are blocked. This can be potentially verified by developing synthetic traffic that is expected to be rejected. However, this approach is unnecessary utilizes resources and is time consuming to implement.

There are also additional practical issues that emerge from complexity of managing network policies. As systems grow, it may be beneficial to reorganize the policies, change their structure, aggregate or split some rules. Due to the problems stated above, this is a difficult task prone to errors. Additionally, if a specific connectivity in the cluster is blocked (but expected to be allowed) or allowed (but expected to be blocked) it may not be trivial to identify which rules or a set of rules lead to that problem.

In such an environment, managing/verifying network policies is a challenging task. The requirements for policies and connection paths may change on daily basis and manual verification of such network policies is not feasible at this rate, speed, and degree of automation. The present disclosure describes improved techniques for verifying network policies for containerized applications.

The techniques described allow a user to comprehensively verify network security policies against a pre-established baseline at multiple points of the policy deployment cycle. Disclosed system provides both an early feedback on policy effectiveness as well as end-to-end verification of its intended operation. The system allows building efficient continuous delivery systems that can verify policy as early as it is developed, instead of in production or test environment or by observation of functional regression. At the same time, these techniques allow the user to verify policies at the cluster entry point to ensure validity of policies configured manually by operators. It also provides deployment-time and runtime verification of policy effectiveness by testing cluster controls against a baseline.

Referring now to the drawings, FIG. 1 depicts an example of a computing environment 100 (e.g., a containerized environment, etc.) for utilizing network policies for components of an application (e.g., a containerized application) deployed in the computing environment, in accordance with at least one embodiment. The computing environment 100 may include a test environment 112 and a production environment 122. The test environment 112 and the production environment 122 may comprise one or more computing systems that execute computer-readable instructions (e.g., code, program) to implement the test environment 112 and the production environment 122. As depicted in FIG. 1, the test environment 112 includes a test system 108 and the production environment 122 includes a deployment orchestrator system 116. Portions of data or information used by or generated in the test environment 112 and the production environment 100 as part of its processing may be stored in a persistent memory such as a network security policy data store 120. The systems depicted in FIG. 1 may be implemented using software (e.g., code, instructions, program) executed by one or more processing units (e.g., processors, cores) of a computing system, hardware, or combinations thereof. The software may be stored on a non-transitory storage medium (e.g., on a memory device).

The computing environment 100 depicted in FIG. 1 is merely an example and is not intended to unduly limit the scope of claimed embodiments. One of ordinary skill in the art would recognize many possible variations, alternatives, and modifications. For example, in some implementations, the computing environment 100 can be implemented using more or fewer systems than those shown in FIG. 1, may combine two or more systems, or may have a different configuration or arrangement of systems and subsystems.

The computing environment 100 may be implemented in various different configurations. In certain embodiments, the computing environment 100 comprising the test system 108 and the deployment orchestrator system 116 may be implemented in an enterprise servicing users of the enterprise. In other embodiments, the systems in the computing environment 100 may be implemented on one or more servers of a cloud provider and the network security policy creation services of the systems may be provided to subscribers of cloud services on a subscription basis.

In certain embodiments, a user may interact with the test system 108 using a user device 102 that is communicatively coupled to the test system 108, possibly via one or more communication networks. The user device 102 may be of various types, including but not limited to, a mobile phone, a tablet, a desktop computer, and the like. The user may represent a user of an enterprise who subscribes to the services provided by the systems of the computing environment 100 for automatically generating and/or verifying network policies for components of an application to be deployed in the computing environment. The user may interact with the test system 108 using a browser executed by the user device 102. For example, the user may use a user interface (UI) (which may be a graphical user interface (GUI)) of the browser executed by the user device 102 to interact with the test system 108.

At any suitable time, the test system 108 may be configured to obtain a baseline set of network security policies (e.g., from the network security policy data store 120, a storage location configured to store such information). In some embodiments, the baseline may include any suitable combination of positive paths and/or negative paths. The "positive paths" include paths that are expected to have connectivity in the cluster. These paths may be used to establish that expected connectivity is in place and avoid functional regression due to policy misconfiguration. "Negative paths" are paths that are expected to have the connectivity blocked. Testing negative paths enables the system to test that a policy or cluster misconfiguration does not accidentally open connectivity that is meant to be denied.

In some embodiments, the baseline set of network security policies identifying allowed and/or restricted connections and/or traffic flows may be user-defined or system-defined. As a non-limiting example, the test system 108 may be configured to receive one or more network security policies as user input. Users may know or want to ensure that, certain paths are permitted and certain are not. For example, a direct connection from a front-end source to a back-end database would be a path that developers usually do not want to allow. This type of path would be an example of a negative path that the system would be able to confirm that such connection is blocked. Conversely, a back-end source connectivity to a database should be allowed and the system would be able to confirm this as well.

In some embodiments, the test system 108 may be configured to automatically generate network security policies. Examples of such techniques may be found in U.S. patent application Ser. No. 17/124,162, entitled "Techniques for Generating Network Security Policies for Application Components Deployed in a Computing Environment," the entire contents of which are incorporated by references for all purposes.

As yet another example, the test system 108 may be configured to generate a baseline set of network security policies based at least in part on monitoring the traffic of the system. The system can generate a list of paths by logging the traffic paths in the cluster and keep curating the list as the system observes new traffic. The system can identify the paths from observed network traffic and mark these observed paths as positive cases. Once set of positive paths is established, the system could also generate negative paths by identifying paths any paths that are not in the set of positive cases.

Figure 2:
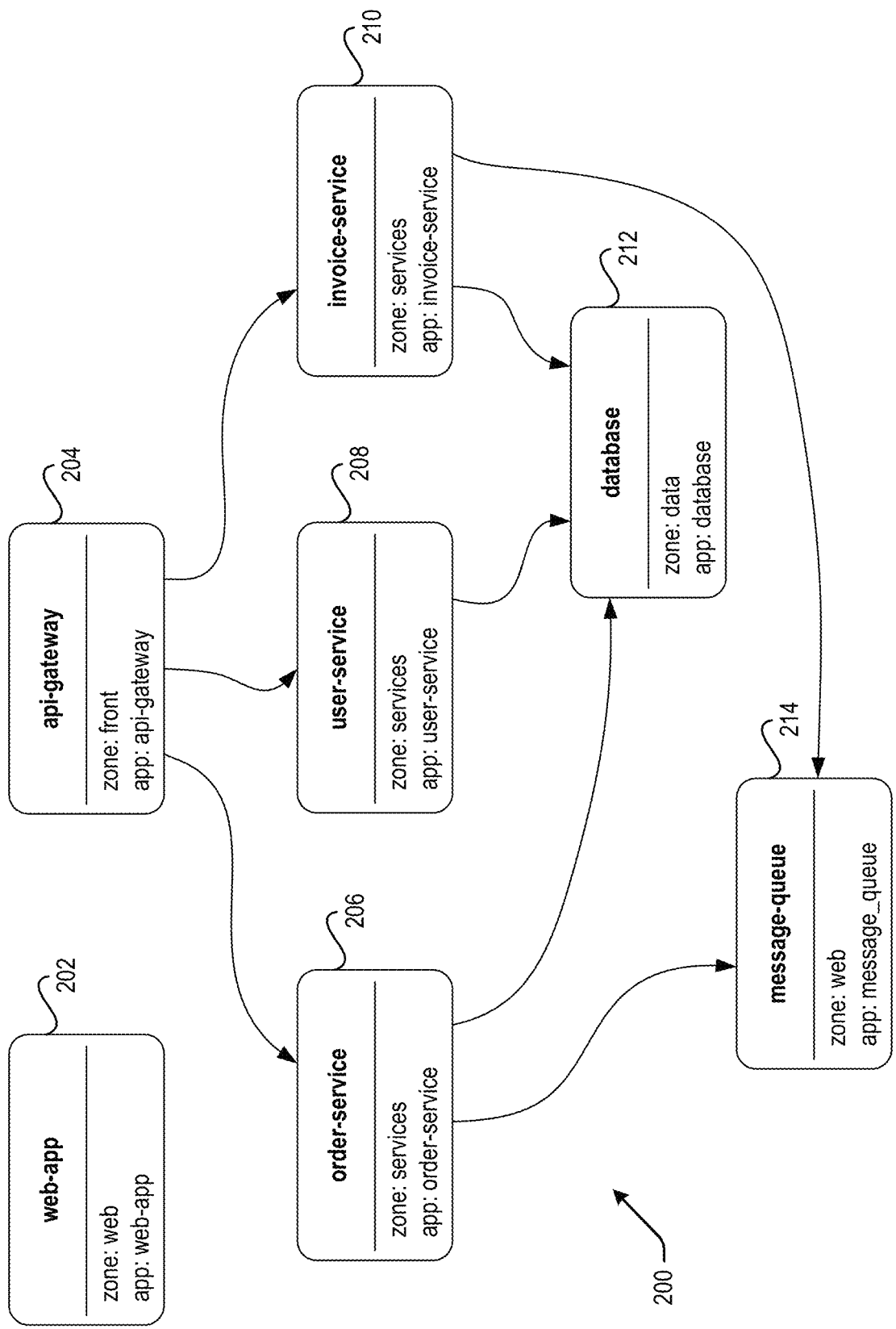
FIG. 2 depicts an example of an application deployed in a containerized environment of the computing environment shown in FIG. 1, in accordance with at least one embodiment.

At 104, a user may provide an application to be deployed in the computing environment. The application may represent a micro-service based containerized application that may be deployed in the production environment 122. In certain examples, the application 104 may comprise multiple components where multiple instances of each component can be executed as containers on nodes within a cluster of nodes in a containerized environment of the production environment 122. In certain examples, the containerized environment may be provided by a container orchestration platform such as Kubernetes, OpenShift, Docker Swarm, and the like. An example of an application deployed to a production environment 122 is shown in FIG. 2.

In certain examples, the application (comprising a set of one or more components) may be provided to the test system 108 prior to its deployment in the containerized environment. At 105, the user may provide, via the UI, one or more network policies that identify one or more rules for allowing and/or disallowing traffic between components of the application and/or other components of the production environment 122. In some embodiments, the network policies for the application may be provided with the application at 104. In at least one embodiment, at least one of the network policies may be generated by the test system 108.

In some embodiments, the test system 108 may be configured to perform operations related to performing a static verification of the network security rules. Static verification may be performed by testing the connectivity of network paths related to the set policies and verifying that the actual outcome of actions match the baseline's expected outcome. The baseline network security rules may be modeled as network egress/ingress rules and connectivity paths. By way of example, a connectivity path may be maintained in a path data structure which indicates a label corresponding to one end of a connection, a label corresponding to the other end of a connection, and (optionally) a port. A connectivity path may be defined as:

$$Path = Set(Label)_1 \times Set(Label)_2 \times P$$

where $Set(Label)_1$ is the set of labels by which one set of components are identified (e.g., components from which the traffic flows), $Set(Label)_1$ is the set of labels by which another set of components are identified (e.g., components to which the traffic flows), P denotes a port number, and × denotes a Cartesian product operation. An ingress rule may be stored in a different data structure (e.g., a communication policy data structure) that identifies a label select one or more components, another label identifying a direction of the traffic (e.g., "from" indicating incoming traffic), and (optionally) a port on which traffic is expected. Similarly, an egress rule may be stored in a communication policy data structure that identifies a label that selects one or more components, another label that identifies a direction of the traffic (e.g., "to" indicating outgoing traffic), and (optionally) a port on which traffic is expected. In some embodiments, the system may group ingress rules (also referred to as ingress policies, which are a type of network security rule) and egress rules (also referred to as egress policies, which are a type of network security rule) to form a network security policy.

In some embodiments, the test system 108 may utilize a number of predefined operations (e.g., set operations, relations). By way of example, some operations may be performed based at least in part on relating various objects through their labels (referred to as determining a label's coverage). The user may submit queries for a given connectivity path. The test system 108 may configured to utilize the connectivity path data structures and the communication policy data structures to identify a rule's "coverage," that is to map a connectivity path (specified in a path data structure) to an ingress or egress rule to produce an outcome. An "outcome" may specific a relationship between a rule and a path. By way of example, in some embodiments, an outcome may be one of three values (although more may be utilized if desired): "none," "allow," and "deny." It should be appreciated that these values may be denoted in any suitable way (e.g., by using integers such as 0 for "none," 1 for "allow," and 2 for "deny"). An outcome of "none" may indicate that the rule does not select the component(s) specified by the path. An outcome of "allow" may indicate that the rule selects the component(s) specified by the path and allows traffic to/from the other end of the path. An outcome of "deny" may indicate that the rule selects the component(s) specified by the path but does not allow traffic to/from the other end of the path. Thus, the user may submit queries to statically test that the outcome of the network security policies will result in outcomes that match the expected behavior. If the outcomes do not match the expected behavior the user may be notified. It should be appreciated that the techniques for statically verifying the network policies as described above may be performed at any suitable time (e.g., prior to or subsequent to deployment).

In certain embodiments, the test system 108 generates a deployment package 114 that includes the component(s) of the application 104 to be deployed and their associated network polices. A deployment orchestrator system 116 in the production environment 122 receives the deployment package 114 and uses the deployment package to deploy the component(s) of the application and their associated network policies to different nodes in a cluster of nodes in the containerized environment. In certain examples, the deployment orchestrator system 116 stores information identifying the network policies associated with the different components in the network security policy data store 120.

In certain situations, to facilitate non-disruptive transition during an upgrade, or to provide a gradual change delivery model during the application development process, both an earlier version of the component and an updated (or new) version of the component may need to co-exist and execute in parallel the containerized environment for some time. In certain embodiments, the test system 108 and the deployment orchestrator system 116 include capabilities for enabling different versions of a component of a containerized application to co-exist on different computing nodes in a cluster of nodes of the containerized environment at the same time. The systems additionally include capabilities for enabling different network policies to be generated for and applied to the different versions of the component, where each component has potentially different network requirements.

In certain embodiments, the test system 108 may be configured to perform dynamic verification of the network security rules. By way of example, the test system 108 (or another component of the test environment 112 and/or production environment 122) may include initializing connections between containers in the cluster to verify that a network security policy is operational (e.g., that connections that ought to be allowed are successful and connections that ought not to be allowed fail).

FIG. 2 depicts an example of an application (e.g., a containerized application) deployed in a containerized environment of the computing environment 100 shown in FIG. 1, according to certain embodiments. A containerized application refers to an operating system level method used to deploy and run distributed applications without launching an entire virtual machine (VM) for each application. Multiple isolated applications or services may run on a single host and access the same OS kernel. In the depicted example, the application comprises an order processing application 200 that is deployed in a container-based framework within the production environment 122 of the computing environment 100. Multiple instances of each component are executed as containers on nodes within a cluster of nodes within the container-based framework. By way of example, the container-based framework may be implemented using a container orchestration tool such as Kubernetes, OpenShift, Docker Swarm, and the like.

In certain examples, the order processing application 200 may include a set of components. These components may include, but are not limited to:
- a static web application front-end component 202 providing user experience in the web browser;
- an Application programing Interface (API) gateway component 204 to the application, responsible for processing API calls from the web application component (e.g., web application front-end component 202) and forwarding them to respective services implementing the business logic;
- a collection of service components providing distinct functions of the application such as processing orders, invoices and user management. By way of example, the collection of service components may include, but are not limited to, an order-service component 206, a user-service component 208 and an invoice-service component 210; and
- data middleware component for storing and processing data, including a database component 212 and a message queue component 214.

In certain examples, for purposes of discussion, it is assumed that the components 202-214 can communicate directly with one another. In a certain implementation, each component is denoted by its name and a corresponding zone label. By way of example, the web application front-end component 202 may be denoted by an app label "web-app" and a corresponding zone label "web." Further, in the depicted example, the web application front-end component 202 does not communicate with the other components that make up the order processing application 200 but the API gateway component 204 communicates with the services 206, 208 and 210. Additionally, in this example, all the service components, 206, 208 and 210 communicate with each other (but not necessarily each service reaches each other service), the services communicate with the database component 212 and the order-service component 206 and invoice-service component 210 access the message queue component 214.

The different components of the order processing application 200 depicted in FIG. 2 are merely an example and is not intended to limit the scope of claimed embodiments. One of ordinary skill in the art would recognize many possible variations, alternatives, and modifications. For example, in some implementations, the order processing application 200 may comprise more or fewer components than those shown in FIG. 1, may combine two or more components, or may have a different configuration or arrangement of components. It should also be appreciated that although the components depicted in FIG. 2 are denoted with two labels (a label denoting an app name, a label denoting a zone) any suitable number of labels may be assigned to any suitable combination of one or more components.

Figure 3:
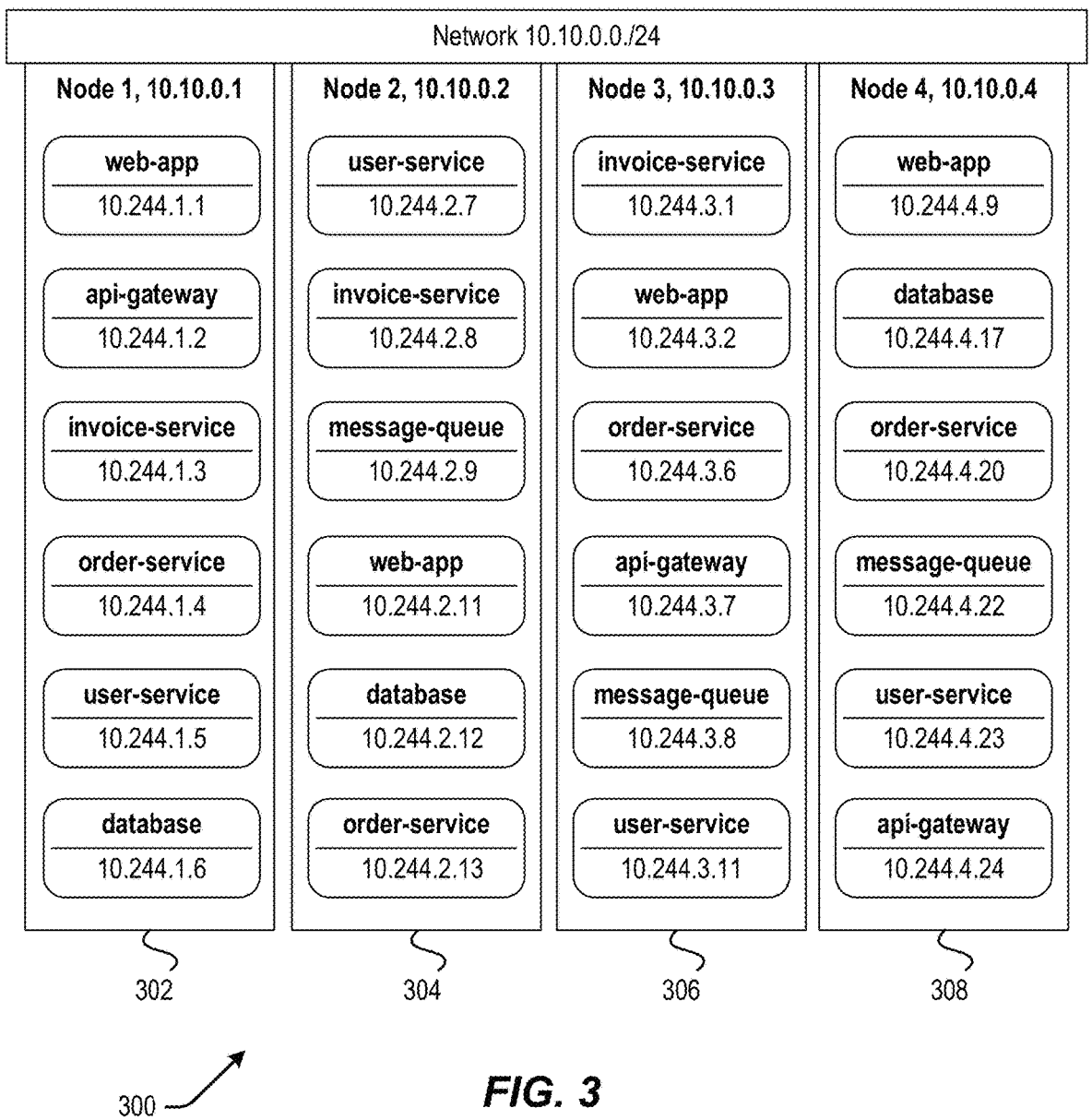
FIG. 3 depicts an example arrangement of components of the application shown in FIG. 2 on a cluster of nodes in a container-based framework, in accordance with at least one embodiment.

FIG. 3 depicts an example arrangement of components of the application shown in FIG. 2 on a cluster of nodes 300 in a container-based framework, in accordance with at least one embodiment. Each node in the cluster of nodes is assigned an Internet Protocol (IP) address. In the depicted example, the cluster of nodes 300 consists of four nodes (node 1, node 2, node 3 and node 4), each with an IP address within the range of its network, such as cloud Virtual Cloud Network (VCN) or physical network. The containers, residing on each of the nodes in the cluster use a different IP address range. Traffic between components on different nodes is typically tunneled and container-to-container packages are encapsulated as node-to-node packages. The depicted example illustrates a specific arrangement of the components in a point in time snapshot of the container-based framework. The framework may re-arrange the components or move them between nodes to distribute the load. Additionally, the specific containers may fail and new instances may get created, nodes may be added or removed, and so forth. In each such case, since the IP addresses of the containers that change will also likely change, any network filtering controls (e.g., network policies) that are based on identifying components using their IP addresses may be impractical or infeasible to implement by the container-based framework.

As previously described, in order to compensate for these challenges, container orchestration frameworks may include capabilities for controlling the communication (i.e., network security) between the components of the application by using a set of one or more predefined (coarse-grained) network policies. For example, in a container-based framework such as Kubernetes or OpenShift, the network security policy may be defined based on metadata of the specific components such as labels (e.g., the zone(s)) as shown in FIG. 4. Additional examples of network security policies defined by container-based frameworks for controlling network traffic between multiple components of a containerized application are described in FIG. 4.

FIG. 4 depicts various examples of network security polices defined by a container-based framework for a containerized application deployed on a cluster of nodes in the container-based framework, according to certain embodiments. For purposes of discussion, the network security policies depicted in tables 402, 404, and 406 are described in relation to the order processing application 200 described in FIGS. 2 and 3. In one implementation, as shown in table 402, the set of policies may be defined using a "zone label" as a source label and a destination label for the components of the containerized application (e.g., 200). In a certain implementation, the set of policies may be implemented using JavaScript Object Notation (JSON) objects or as YAML objects. The zone-based network security policies depicted in table 402 may permit some traffic that is not part of the regular system operation, such as connectivity from the user-service component 208 to the database component 212. These zone-based policies will not require to be updated when routine incremental changes occur to the containerized application, such as when more services or database middleware are added to the application. The zone-based policies also continue to be operational if more services begin to communicate with each other, such as, for example, the order-service component 206 and the invoice-service component 210. In addition, the zone-based policies defined by the container-based framework typically allow traffic between the components, unless a certain path is specifically covered by the policy. For this reason, in order to deny the internal traffic to certain components (such as 'web' or 'front' zones), the zone-based polices may include policy directives with an empty origin denoted with '-'.

In another approach, as shown in table 404, the set of policies may be implemented using an "app label" (e.g., the "app" corresponding to each component, such as "api-gateway" for 204 of FIG. 2) as a source label and a destination label where the "app label" uniquely identifies the components of the container-based application. In this implementation, the policy that most precisely reflects the network traffic in the system will take the form shown in table 404. Such a policy may disallow any traffic not expected in the system but changes to the application will require corresponding policy changes to be applied to the components of the application.

In yet another implementation, the container-based framework may implement a more balanced policy that takes advantage of both of the "zone label" and the "app label" used to uniquely identify the components of the application. For example, a network analysis of the application may reveal that a key component of concern is the message queue component 214. While it is acceptable to have general zone-based rules between the API gateway component 204 and the services 206, 208 and 210, the services themselves, the database component 212, and the communication with the message queue component 214 need to be strictly restricted to the services that need the access. In such a case, the set of policies may take a form shown in table 406. It is to be appreciated that the terms, "zone label" and "app label" used in this disclosure are illustrations of one type of grouping of components that may be utilized in an application for defining the flow of network traffic within the application. For instance, a "zone label" may identify a first group of components to which a first version of the component can send traffic and an "app label" may identify a second group of components to which the first version of the component can send traffic. The "zone label" may identify a larger group (e.g., a set) of components that the first version of the component can send traffic while the "app label" may identify a specific set (e.g., a subset) of components within the larger group that the first version of the component can send traffic. In some embodiments, different label names, different label groups, or different layers of labels (e.g., a zone cell, a four-label model for referencing the component and the like) may be used to identify and group components of an application.

Figure 5:
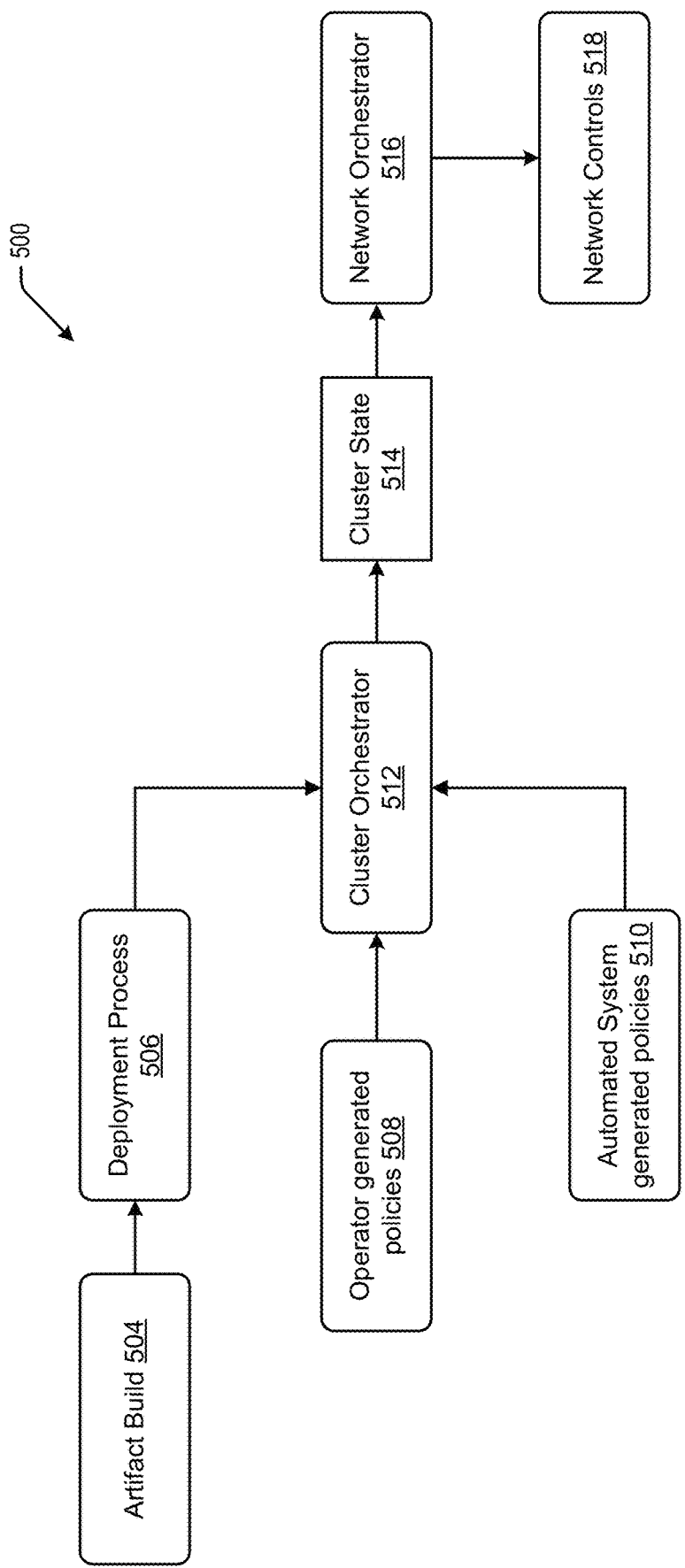
FIG. 5 depicts a block diagram that illustrates an example lifecycle of network traffic policies, in accordance with at least one embodiment.

FIG. 5 depicts a block diagram that illustrates an example lifecycle 500 of network traffic policies, in accordance with at least one embodiment. A network traffic policy can originate from a number of different sources.

By way of example, a network security policy may originate as part of a cloud infrastructure (CI)/cloud deployment (CD) pipeline. Development teams working on functional changes may identify a need to open or restrict certain connectivity. The network policies may be developed with the corresponding code. At 502, those network policies may be packaged with the corresponding code as part of the artifact build (e.g., performance of a software build). At 504, the network policies may be deployed together with the corresponding code as part of the deployment process performed at 506. It may be assumed that new code with network security policies will be tested via using functional and integration testing before deployment. However, negative testing, that is testing that verifies whether traffic that ought not be allowed (that normally does not occur) is indeed blocked, will likely not be performed.

In some embodiments, operators may interact directly with the container orchestrator to generate network security policies at 508. In some embodiments, this may be the only way that network security policies are configured, for example, if no CI/CD practice is followed. In some embodiments, the operator may add specific network security policies, for example, in response to a threat. In these scenarios, operators may not perform comprehensive testing of the policy before deploying it into production system. For example, the operator may try it out on a staging environment and observe whether any functional regression occurs.

Another potential source of network security policies may include automated systems that react to observed threats or changing needs for network controls. At 510, such systems may create or adjust network security policies at runtime.

The cluster orchestrator 512, a control plane of the cluster, may provide interfaces to configure the network security policies. In some embodiments, the cluster orchestrator 512 may determine whether the network security police is syntactically correct. However, semantics, that is whether the policy makes sense, or whether it will be effective, or non-disruptive is typically tested. In most common frameworks, the policy is then recorded in a cluster state 514.

The network orchestrator 516 (e.g., a network driver) may act on the network security polices to create network controls 518. The network orchestrator 516 may be a separate, pluggable module deployed in the cluster to orchestrate the network between containers. A cloud network interface may be used to define a common interface for such models. However, the level of support for network security policies varies across different network drivers. Some do not provide such support at all, focusing only on package delivery. It may be the case that the cluster utilizes multiple drivers, one for general connectivity, and one for network policies support. It is often not the network orchestrator 516 itself that manages the packet flow. Instead, the network orchestrator 516 typically orchestrates downstream systems such as a worker node, a network stack, or a cloud provider's network configuration. So for example, a policy created in a cluster may be picked up by the network orchestrator 516 and turned into a host-native mechanism for controlling traffic, such as Internet Protocol (IP) tables' rules on each node.

The network security policy may be still be made ineffective by an external configuration of that specific mechanism. For example, an operator managing the host itself may unwittingly add a rule that overshadows rules set by the network orchestrator 516. This error will typically not be directly visible to the operators analyzing the policies at the cluster level.

The information used by the network orchestrator 516 is not (or not directly) accessible by the person interacting with the cluster. Even if the cluster's network driver does not support network security policies, the operator may still be able to create a network security policy in the cluster, see it being recorded in the cluster state at 514, and see it listed in a list all existing policies. Conventionally, there is no error or waning that that policy will not be effective (e.g., because the network orchestrator 516, a network driver, does not support network security policies). The network driver may be removed or reconfigured at a later stage, which may effectively disable the policy enforcement, but this will not be reflected in the cluster state 514. An operator, or automated system, when viewing the cluster state may still see network security policies enabled in the cluster.

As described above, there is multiple potential points at which a network security policy may fail to provide the expected outcome. It may be due to semantic error in policy definition, overshadowing by another policy, a missing or misconfigured network driver or host/cloud level controls rendering policy useless. In each of these situations, conventionally, there is no feedback to the operator or an automated system deploying the network security policy.

Figure 6:
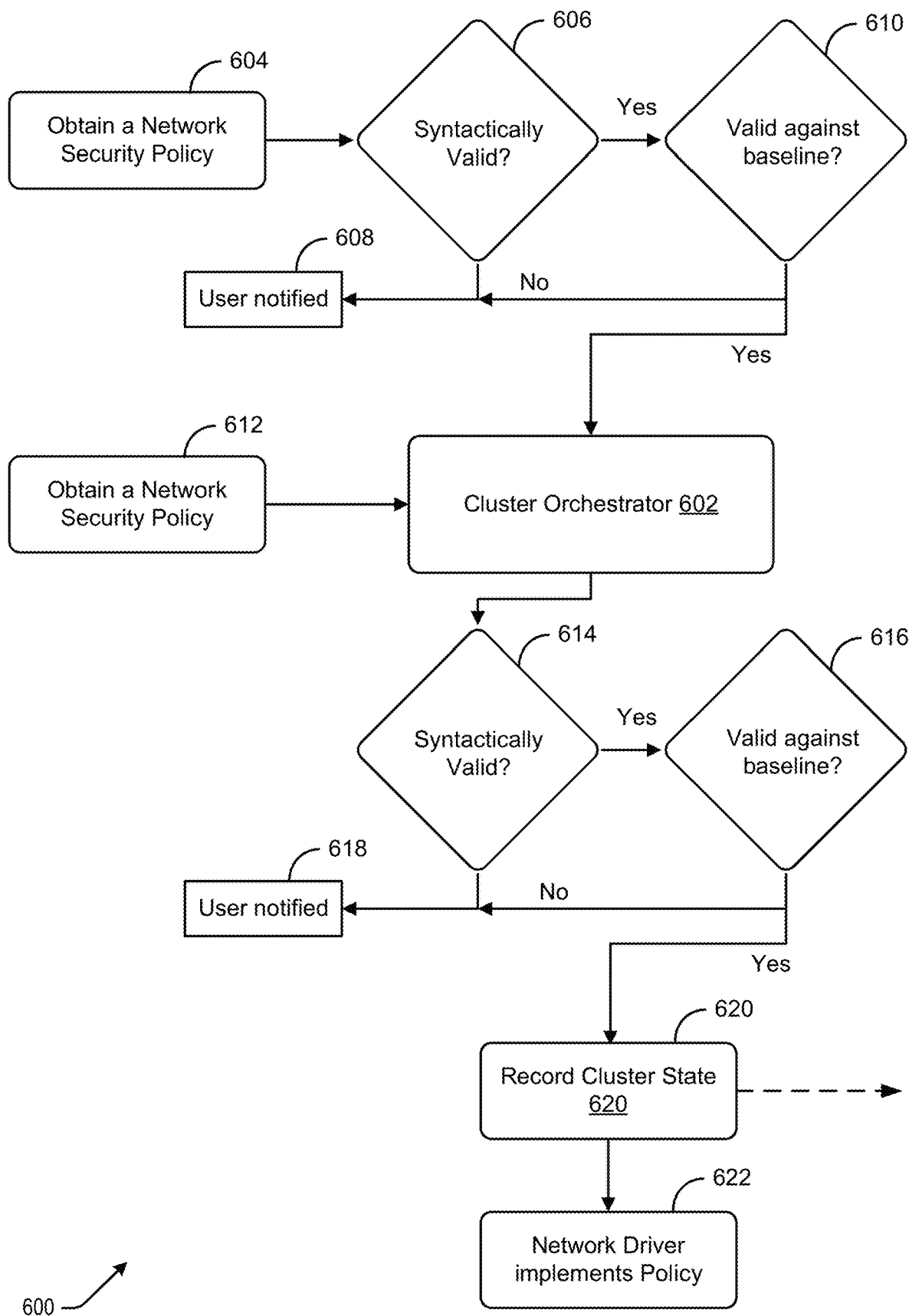
FIG. 6 depicts a block diagram that illustrates an example of operations performed by a verification system to statically verify one or more network security rules, in accordance with at least one embodiment.

FIG. 6 depicts a block diagram 600 that illustrates an example of operations performed by a verification system to statically verify one or more network security rules, in accordance with at least one embodiment. The operations may be performed by the test system 108 of FIG. 1, the cluster orchestrator 602 (e.g., an example of the deployment orchestrator system 116 of FIG. 1, or a separate component configured to perform such verification operations (not depicted).

At 604, a network security policy (e.g., a positive path or a negative path) may be obtained. As discussed above, the network security policy may be obtained as part of a process for obtaining a baseline set of network security policies (e.g., from the network security policy data store 120 of FIG. 1, a storage location configured to store such information). The network security policy may be one of the baseline set of network security policies.

In some embodiments, the baseline set of network security policies identifying allowed and/or restricted connections and/or traffic flows may be user-defined or system-defined. As another example, the network security policy may be automatically generated. Examples of such techniques may be found in U.S. patent application Ser. No. 17/124,162, entitled "Techniques for Generating Network Security Policies for Application Components Deployed in a Computing Environment." As yet another example, a baseline set of network security policies may be generated based at least in part on monitoring the traffic of the system. For example, the system can generate a list of paths by logging the traffic paths in the cluster and keep curating the list as the system observes new traffic. The system may identify positive paths from observing network traffic (e.g., identifying traffic flowing from one container to another, potentially via a particular port). Provided that the set of positive paths is established, negative paths could also be generated by identifying paths that are not in the set of positive cases.

In some embodiments, the network security policy obtained at 604 may be validated at 606 to ensure the policy is syntactically valid. Syntax validation is the process of checking whether the syntax of a program is free of programming or stylistic editors. There are a number of tools to check syntax for almost every programming language. If the network security policy is determined to be invalid at 606, the user may be notified at 608 (e.g., via any suitable electronic means such as an email, a text message, an alert, an alarm, etc.).

If the network security policy is syntactically valid, the network security policy may then be validated again the baseline set of network security policies at 610. A number of predefined operations (e.g., set operations, relations) may be defined that may be used by the system to perform this validation. By way of example, some operations may be performed based at least in part on relating various objects through their labels (referred to as determining a label's coverage). A first set of labels matches a second set of labels if the first set of labels is a subset of the second set of labels. The subset symbol $\subseteq$ may be used to denote a label subset.

For example, given the following sets of labels:

L1={('zone', 'services'), ('app', 'order-service')}
L2={('zone', 'services'), ('app', 'user-service')}
L3={('zone', 'services')}
L4={('app', 'order-service')}
L5={ }

The system may be configured to consider the following statements as true (e.g., that the set of labels on the left hand side is a subset of the set on the right-hand side). An empty set (denoted '{ }') may be considered to be a subset of any other set.

$L3 \subseteq L1$
$L3 \subseteq L2$
$L4 \subseteq L1$
$L5 \subseteq L1$
$L5 \subseteq L2$ An "outcome" may specific a relationship between a rule and a path. By way of example, in some embodiments, an outcome may be one of three values (although more may be utilized if desired): "none," "allow," and "deny." It should be appreciated that these values may be denoted in any suitable way (e.g., by using integers such as 0 for "none," 1 for "allow," and 2 for "deny"). An outcome of "none" may indicate that the rule does not select the component(s) specified by the path. An outcome of "allow" may indicate that the rule selects the component(s) specified by the path and allows traffic to/from the other end of the path. An outcome of "deny" may indicate that the rule selects the component(s) specified by the path but does not allow traffic to/from the other end of the path.

The system may be configured to identify a rule's "coverage," that is to map a connectivity path (specified in a path data structure) to an ingress or egress rule to produce an outcome. By way of example, the coverage of an ingress rule may be denoted as follows:

IngressRuleCoverage: Path×IngressRule→Outcome

{NONE, if rule.components$\not\subseteq$z,900 path.to IngressRuleCoverage(path, rule)={ALLOW, if rule.components$\subseteq$path.to &&
{rule.from$\subseteq$path.from &&
{rule.port=path.port
{DENY, otherwise Similarly, the coverage of an egress rule may be denoted as follows:

EgressRuleCoverage: Path×EgressRule→Outcome

{NONE, if rule.components ⊄ path.from EgressRuleCoverage(path, rule)={ALLOW, if rule.components⊆path.from &&
{rule.to⊆path.to &&
{rule.port=path.port
{DENY, otherwise In some embodiments, the system may be configured to determine rule equivalence. Rule equivalence may refer to a binary relationship between two rules of the same type (e.g., two egress rules, two ingress rules). The system may be configured to consider two rules to be equivalent when both rules have a same outcome for a set of paths. By way of example, the relation for ingress rules is defined as follows:

~Set(Path): Set(Path)×IngressRule×IngressRule $r_1$ ~paths $r_2$ ⇔ ∀ path ∈ paths: IngressRuleCoverage(path, $r_1$)=IngressRuleCoverage(path, $r_2$)

The relation for egress rules is defined analogously with:

~Set(Path): Set(Path)×EgressRule×EgressRule $r_1$ ~paths $r_2$ ⇔ ∀ path ∈ paths: EgressRuleCoverage(path, $r_1$)=EgressRuleCoverage(path, $r_2$)

With respect to a static set of paths, the equivalence relation is both reflexive, symmetric, and transitive, that is:

r ~paths r
$r_1$ ~paths $r_2$→$r_2$ ~paths $r_1$
$r_1$ ~paths $r_2$ && $ir_2$ ~paths $r_3$→$r_1$ ~paths $r_3$ In some embodiments, the system may be configured to combine the outcome of multiple rules. In some embodiments, if any the outcomes are "allow," the combined outcome may be identified as "allow," if any of the outcomes are "deny," the combined outcome may be identified as "deny," and the outcome may be identified as "none" if none of the outcomes are "allow" or "deny". For example:

Combine: Set(Outcome)→Outcome
{ALLOW, if ALLOW ∈ outcomes
Combine(outcomes)={DENY, if DENY ∈ outcomes
{NONE, otherwise Which can be read as select allow, if any of the outcomes are allow, if none are allow, then select deny if any of the outcomes are deny, if none of the outcomes are allow and none of the outcomes are deny, select none. Given the above, the definition of rule coverage may be extended to arbitrary sets of rules, such that:

IngressRulesCoverage: Path×Set(IngressRule)→Outcome

IngressRulesCoverage(path, rules)=Combine({IngressRuleCoverage(path, rule) |rule ∈ rules})

The relation of egress rule may be defined analogously. Additionally, the equivalence relation may be extended to arbitrary sets of rules such that:

~Set(Path): Set(Path)×Set(IngressRule)×Set(IngressRule)

$r_1$ ~paths ⇔ ∀ path ∈ paths: IngressRulesCoverage(path, $r_1$)=IngressRulesCoverage(path, $r_2$)

The relation for egress rule set may be defined analogously.

The system may be configured to define a number of additional relations. For example, a relation, IngressPolicyCoverage, may be used to map path and ingress policy to a set of outcome/rule tuples. Another relation, EgressPolicyCoverage, may be used to map path and egress policy to a set of outcome/rule tuples. Another relation, PolicyCoverage, may be used to map a path and entire policy to a set of outcome/rule tuples, may be defined as a union of ingress and egress rule mappings (e.g., the union of the IngressPolicyCoverage for the ingress policy and the EgressPolicyCoverage for the egress policy). Another relation, PolicyTrafficCoverage, may be used to map path and policy to a set of outcome/rule tuples. Yet another relation, PolicyTrafficOutcome, may be used to map path and policy to a set of outcome/rule tuples (e.g., PolicyTrafficCoverage). These outcomes may then be combined in the manner discussed above to determine a single outcome.

Thus, at 610, the coverage of each network security policy with respect to every connectivity path may be identified (or at least the received network security policy with respect to a corresponding connectivity path) and compared to the expected behavior defined by the network security polices (e.g., the received security policy) of the system. If the coverage matches the expected behavior, the network security policy may be deemed valid. If a discrepancy is identified, the network security policy may be deemed invalid.

If the network security policy is not valid with respect to the baseline set of network security policies, the user may be notified via any suitable electronic means at 608. However, if the network security policy is determined to be valid, the network security policy may be packaged and deployed by the cluster orchestrator 602 at any suitable time.

At 612, another network security policy may be obtained. By way of example, an operator may modify an existing network security policy or generate a new one via a user interface of the cluster orchestrator 602. As another example, the system may be configured to modify/generate network security policies based at least in part on detecting a condition of the network (e.g., an amount of traffic over a threshold amount along one connectivity path may trigger a network security policy that blocks all traffic between two components).

At 614, the cluster orchestrator 602 may be configured to perform operations to determine whether the network security policy received at 612 is syntactically valid. At 616, the cluster orchestrator 602 may be configured to perform operations to determine whether the network security policy received at 612 is valid against the baseline. These may be the same or similar operations as those performed at 610 with respect to the network security policy received at 604. If either check at 614 determines invalidity, the user may be notified at 618 via any suitable electronic means. Otherwise, the network security policy may be recorded in the cluster state at 620. At 622, in response to identifying the network security policy has been recorded in the cluster state, a network driver (e.g., an example of the network orchestrator 516 of FIG. 5) may be configured to implement one or more network controls to allow and/or block traffic to and/or from the node in accordance with the network security policy.

In some embodiments, recording the network security policy in the cluster state may be considered a trigger for dynamically verifying one or more network security rules as described in connection with FIG. 7.

Figure 7:
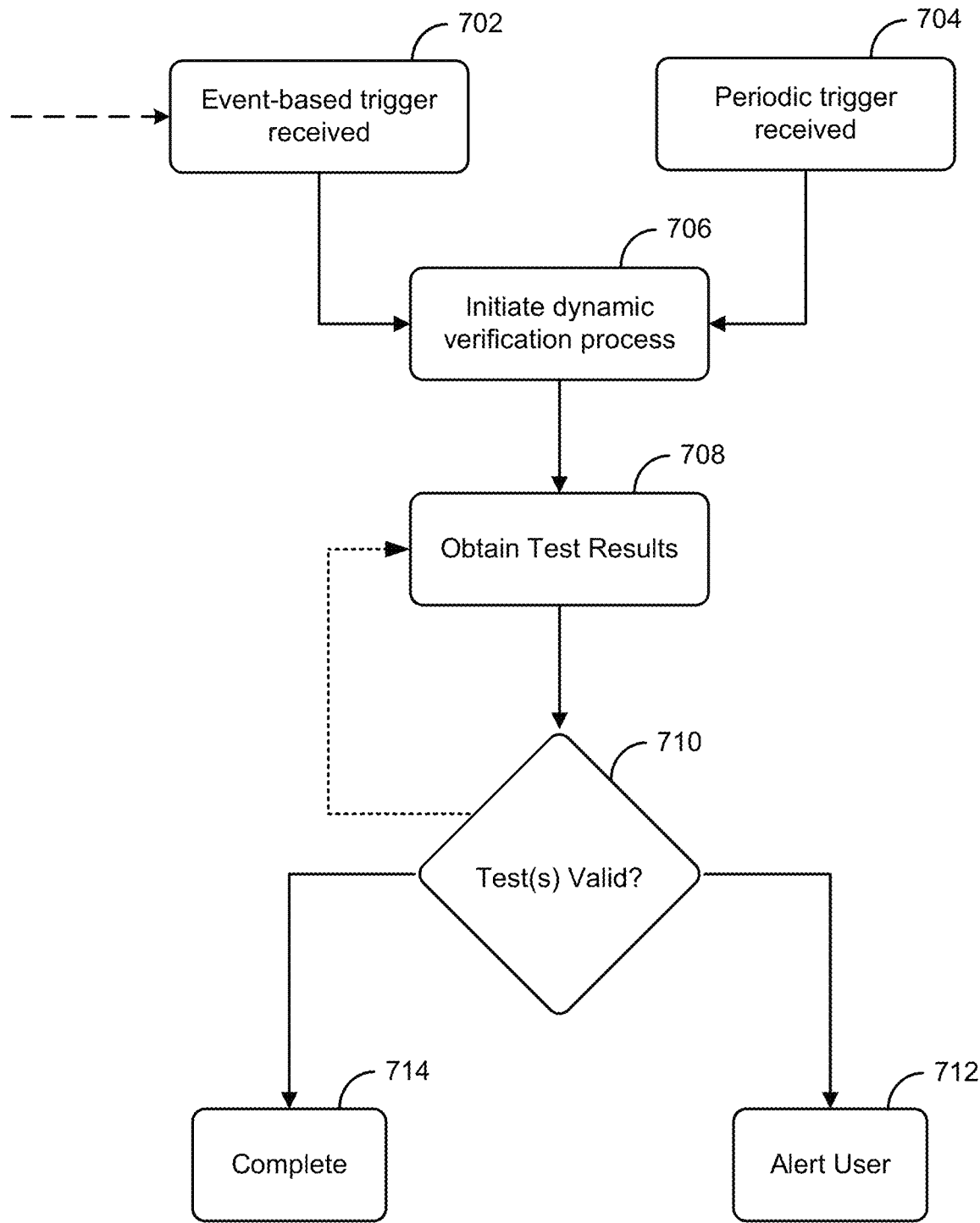
FIG. 7 depicts a block diagram that illustrates an example of operations performed by a verification system to dynamically verify one or more network security rules, in accordance with at least one embodiment.

FIG. 7 depicts a block diagram 700 that illustrates an example of operations performed by a verification system to dynamically verify one or more network security rules, in accordance with at least one embodiment. The operations may be performed by the test system 108 of FIG. 1, the deployment orchestrator system 116 of FIG. 1, the cluster orchestrator 602 of FIG. 6, or a separate component configured to perform such verification operations (not depicted).

At 702, an event-based trigger may be received. The form of the trigger may vary. In some embodiments, the trigger may be detection that the cluster state includes a new or modified (adjusted or deleted) network security policy. In some embodiments, the event-based trigger may be received in response to a user adding a new network security policy and/or the system generating a new network security policy.

At 704, a periodic trigger may be received according to a predefined frequency and/or periodicity and/or a predefined schedule. As a non-limiting example, a predefined schedule may indicate that the network security policies are to be dynamically verified at particular days and/or times.

The event-based trigger and the periodic trigger may individually initiate a dynamic verification process at 706. Dynamic verification may involve generating synthetic traffic in the cluster to verify that the network security policy is operational. This is important for verifying that connectivity is blocked, as there are multiple ways in which a policy mechanism may be rendered ineffective. However, dynamic verification may also catch some less likely misconfiguration that leads to traffic being blocked, such as host-level or underlying network-level rule that blocks all incoming traffic.

In some embodiments, dynamic verification is an asynchronous process that involves initiating a test and waiting for test results. The test involves verifying expected connectivity or lack of connectivity for a set of paths. If any of the paths connectivity differs from the expectation an alert is generated.

In some embodiments, dynamic verification involves, for a given path:

1. Identifying an instance of a container as the source of the connection. (As connectivity paths are typically specified using labels, this process may involve identifying one or more containers (that include this instance) with matching a set of labels).
2. Identifying an instance of a container for the destination of the connection.
3. Initiating a connection from the source container to the destination container.
4. Observing the result of the connection.
5. Reporting any success or failure of the test.

The success or failure of the test does not necessarily correspond to success or failure of a connection. For example, when the path is expected to be blocked, but connection is successful, these conditions indicate a test failure. The verification of the failure should match the behavior of a network policy implementation. For example, if network security policy just ignores the connection attempt (e.g., through IP tables DROP target) the expected behavior should be a connection timeout. Other type of connection failures, such as a being connection refused with an ICMP packet delivered to the source, should also be considered abnormal and indicate a problem with the network security policy.

Container orchestrators typically provide programmable interfaces that allow listing running containers that match specific criteria, such as labels. Using a programmable interface, the system may establish a finite set of all the containers that could act as source and destination of a given test. For example, for a label {app: user-service}, all the services (e.g., user-service 208 of FIG. 2) with that label will be selected. In another example, for a label {zone: services} all the containers with that label (e.g., order-service 206, user-service 208, invoice-service 210 of FIG. 2), that is associated with the zone "services" will be selected.

In large clusters, or with very broadly specified paths (that is paths that use labels that select multiple different containers), the amount of potential combinations can be large. The dynamic verification process, however, does not need to address all of them to produce a reliable result. In some embodiments, the amount of containers that is to be selected could be configurable. For example, a system may be configured to test certain portion of containers in of each destination at random, or only new containers, or containers for which connectivity was not verified in previous run of the dynamic verification (in this case system tracks the state of the verified containers), or containers that are selected by recently added policy, or any combination of these factors. The selection of factors to consider when selecting container may depend on the trigger of the dynamic verification. For example, the selection based on proportion or not-yet-verified containers may happen for a periodic trigger while selection of containers addressed by recently-added policy could be done when verification is triggered by new policy addition, and selection based on container age may happen when new containers are added to the cluster. System administrators may tune these rules to achieve the best results for their specific workload and intended coverage.

In order to perform end-to-end verification, the verification process may need to initiate the connection from container's network namespace to target container's IP address, typically an ephemeral IP address in the cluster's overlay network. In order to do that, the software performing the test may need to run in container's execution context. This can be implemented in multiple ways. By way of example, a sidecar application may be utilized. In some embodiments, the cluster orchestrator may provide a mechanism to inject a sidecar application dynamically into newly created pods. The sidecar application may then be utilized to initiate a connection from the namespace of the given container to another container. Another way to implement the verification is using a privileged process running on a compute instance that hosts containers. The privileged process can then enter the network namespace of a given container to perform the network connection from within the container context. Systems (e.g., Linux, which is a standard platform for hosting containerized workloads) allow such namespace switching. As another example, the system may use a mechanism such as Kubernetes' Daemon Set to ensure that an instance of verification software is hosted on every instance in the cluster.

In some embodiments, each positive path and negative path may be tested. In some embodiments, the negative paths may be user defined or inferred based on the set of positive paths known to the system (e.g., the negative paths may be generated by identifying the set of paths that are not in the set of positive paths). By way of example, automatic verification of negative paths can be done when the baseline containing positive paths is considered to be complete, that is contains all the expected traffic in the cluster. Then, the system can verify the negative paths either heuristically, or by random selection. For example, a random selection may work as follows:

1. Select a (source) container at random
2. Select another (destination) container at random
3. Select all (or random) ports exposed by the destination container
4. Check if the specific path between two containers is not allowed by any of the baseline paths.

A different approach could involve selection that is more direct. For example, a selection process may occur as follows:

1. Select a source container.
2. Identify all the containers/ports that permit the traffic from the source container.
3. Select a destination container from the set of containers/ports that exist in the cluster but are not in the set of permitted destinations from this specific container obtained in the previous step.

All the considerations covered in "Selecting containers for dynamic verification" apply here. Source of destination containers selection may be based on any of the criteria discussed there.

At 708, the system may obtain test results. In some embodiments, the test results may include all of the results from every test performed, or the test results may include a subset of the results obtained from a subset of the tests performed. For example, obtaining the test results may include obtaining all of the test results before checking for validity at 710. In other embodiments, the test results may be obtained incrementally and each test may be checked for validity before proceeding to the next set of test results.

At 710, the system may determine the validity of the test(s). By way of example, the test results of each test may be obtained incrementally. Thus, a determination may be made of each test results whether the test is valid (the expected connection behavior was observed) or not (the actual connection behavior observed did not match the expected connection behavior). If the test is not valid (the actual connection behavior observed did not match the expected connection behavior), the user may be alerted at 712 using any suitable electronic means (e.g., email, text, alert, alarm, push notification, etc.). If the test results were obtained incrementally, the operations of 708-712 may be performed any suitable number of times depending on the number of tests performed.

At 714, if all of the test results are determined to be valid (e.g., the expected connection behavior was observed in each test result), the process may complete.

Figure 8:
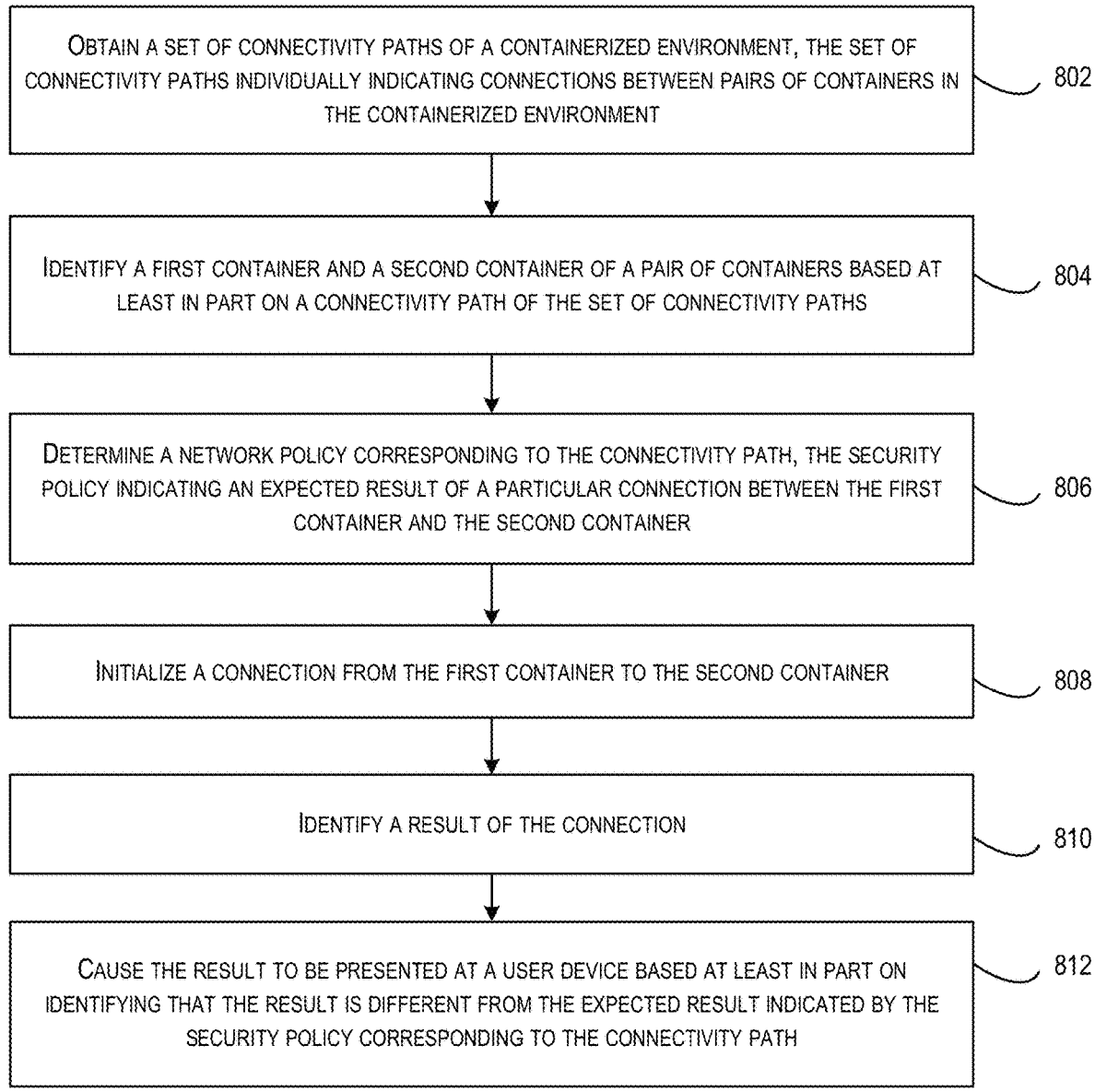
FIG. 8 is an example of a method for verifying one or more network security rules, in accordance with at least one embodiment.

FIG. 8 is an example of a method 800 for verifying one or more network security rules, in accordance with at least one embodiment. The method 800 may be performed in any suitable order. Although a number of operations are described in connection with FIG. 8, it should be appreciated that more or fewer operations may be utilized. In some embodiments, the method 800 may be performed by a query processing system (e.g., as part of the test system 108 of FIG. 1, as part of an application and/or service of the production environment 122 of FIG. 1, etc.).

The method 800 may begin at 802, where a set of connectivity paths of a containerized environment (e.g., environment 200) may be obtained. In some embodiments, the set of connectivity paths may indicate connections between pairs of containers in the containerized environment.

At 804, a first container and a second container of a pair of containers may be identified based at least in part on a connectivity path of the set of connectivity paths. By way of example, the connectivity path may identify a label or set of labels corresponding to a source container. This label or labels may be matched against labels individually associated with each container to identify one or more containers associated with the same label(s). Similarly, the connectivity path may identify another label (or set of labels) corresponding to a destination container. This label or labels may be matched against labels individually associated with each container to identify one or more containers associated with the same label(s). Thus, the system may identify a set of one or more containers that may serve as the source container and a set of one or more containers that may serve as the destination container.

At 806, a network policy corresponding to the connectivity path may be determined. In some embodiments, the network policy indicates an expected result of a particular connection between the first container and the second container. By way of example, a source container may be identified from the set of source containers identified at 804, and a destination container may be identified from the set of destination containers identified at 804. The system may then obtain a network policy (e.g., a communication policy data structure) that identifies a label corresponding to the source container and a label corresponding to the destination container. The policy may indicate that the traffic is to be allowed or blocked. In some embodiments, the policy may relate to a particular port.

At 808, a connection may be initialized from the first container to the second container. As a non-limiting example, a sidecar application may be injected using an interface provided by the cluster orchestrator (e.g., the deployment orchestrator system 116 of FIG. 1, the cluster orchestrator 602 of FIG. 6, etc.). The sidecar application may be utilized by the cluster orchestrator to initialize the connection from the first container to the second container.

At 810, a result of the connection may be identified. By way of example, the connection initialized by the sidecar application may be established or establishing the connection may have failed.

At 812, the system may cause the result to be presented at a user device (e.g., the user device 116 of FIG. 1) based at least in part on identifying that the result is different from the expected result indicated by the network policy corresponding to the connectivity path. For example, an email may be transmitted to the user when a network security policy for that path indicates that the traffic is to be allowed, but the test results indicate the connection failed.

Example Architectures

As noted above, infrastructure as a service (IaaS) is one particular type of cloud computing. IaaS can be configured to provide virtualized computing resources over a public network (e.g., the Internet). In an IaaS model, a cloud computing provider can host the infrastructure components (e.g., servers, storage devices, network nodes (e.g., hardware), deployment software, platform virtualization (e.g., a hypervisor layer), or the like). In some cases, an IaaS provider may also supply a variety of services to accompany those infrastructure components (e.g., billing, monitoring, logging, load balancing and clustering, etc.). Thus, as these services may be policy-driven, IaaS users may be able to implement policies to drive load balancing to maintain application availability and performance.

In some instances, IaaS customers may access resources and services through a wide area network (WAN), such as the Internet, and can use the cloud provider's services to install the remaining elements of an application stack. For example, the user can log in to the IaaS platform to create virtual machines (VMs), install operating systems (OSs) on each VM, deploy middleware such as databases, create storage buckets for workloads and backups, and even install enterprise software into that VM. Customers can then use the provider's services to perform various functions, including balancing network traffic, troubleshooting application issues, monitoring performance, managing disaster recovery, etc.

In most cases, a cloud computing model will require the participation of a cloud provider. The cloud provider may, but need not be, a third-party service that specializes in providing (e.g., offering, renting, selling) IaaS. An entity might also opt to deploy a private cloud, becoming its own provider of infrastructure services.

In some examples, IaaS deployment is the process of putting a new application, or a new version of an application, onto a prepared application server or the like. It may also include the process of preparing the server (e.g., installing libraries, daemons, etc.). This is often managed by the cloud provider, below the hypervisor layer (e.g., the servers, storage, network hardware, and virtualization). Thus, the customer may be responsible for handling (OS), middleware, and/or application deployment (e.g., on self-service virtual machines (e.g., that can be spun up on demand) or the like.

In some examples, IaaS provisioning may refer to acquiring computers or virtual hosts for use, and even installing needed libraries or services on them. In most cases, deployment does not include provisioning, and the provisioning may need to be performed first.

In some cases, there are two different challenges for IaaS provisioning. First, there is the initial challenge of provisioning the initial set of infrastructure before anything is running. Second, there is the challenge of evolving the existing infrastructure (e.g., adding new services, changing services, removing services, etc.) once everything has been provisioned. In some cases, these two challenges may be addressed by enabling the configuration of the infrastructure to be defined declaratively. In other words, the infrastructure (e.g., what components are needed and how they interact) can be defined by one or more configuration files. Thus, the overall topology of the infrastructure (e.g., what resources depend on which, and how they each work together) can be described declaratively. In some instances, once the topology is defined, a workflow can be generated that creates and/or manages the different components described in the configuration files.

In some examples, an infrastructure may have many interconnected elements. For example, there may be one or more virtual private clouds (VPCs) (e.g., a potentially on-demand pool of configurable and/or shared computing resources), also known as a core network. In some examples, there may also be one or more group rules provisioned to define how the network will be set up and one or more virtual machines (VMs). Other infrastructure elements may also be provisioned, such as a load balancer, a database, or the like. As more and more infrastructure elements are desired and/or added, the infrastructure may incrementally evolve.

In some instances, continuous deployment techniques may be employed to enable deployment of infrastructure code across various virtual computing environments. Additionally, the described techniques can enable infrastructure management within these environments. In some examples, service teams can write code that is desired to be deployed to one or more, but often many, different production environments (e.g., across various different geographic locations, sometimes spanning the entire world). However, in some examples, the infrastructure on which the code will be deployed must first be set up. In some instances, the provisioning can be done manually, a provisioning tool may be utilized to provision the resources, and/or deployment tools may be utilized to deploy the code once the infrastructure is provisioned.

Figure 9:
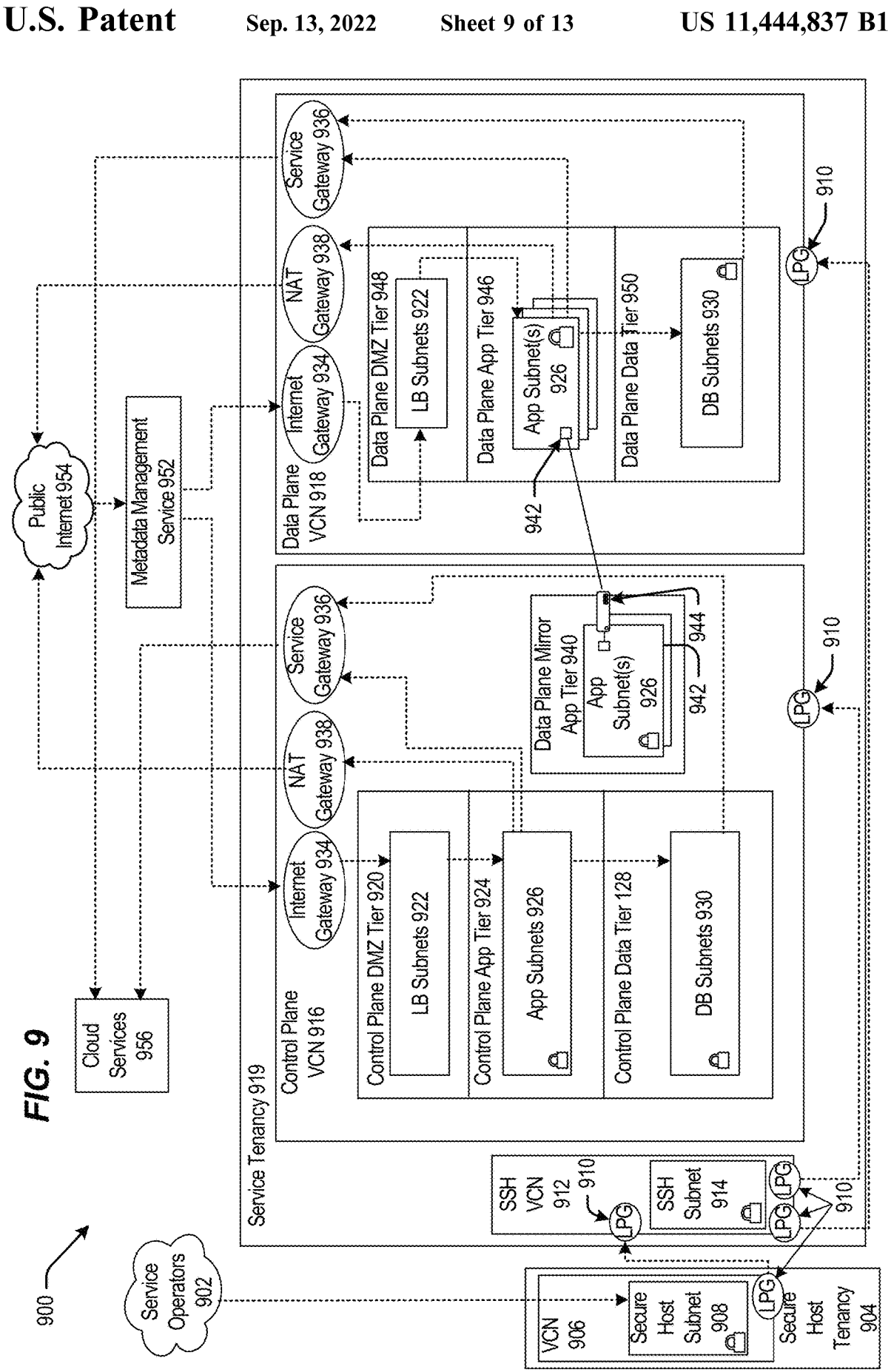
FIG. 9 is a block diagram illustrating one pattern for implementing a cloud infrastructure as a service system, according to at least one embodiment.

FIG. 9 is a block diagram 900 illustrating an example pattern of an IaaS architecture, according to at least one embodiment. Service operators 902 can be communicatively coupled to a secure host tenancy 904 that can include a virtual cloud network (VCN) 906 and a secure host subnet 908. In some examples, the service operators 902 may be using one or more client computing devices, which may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 9, Palm OS, and the like, and being Internet, e-mail, short message service (SMS), Blackberry®, or other communication protocol enabled. Alternatively, the client computing devices can be general-purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices may be any other electronic device, such as a thin-client computer, an Internet-enabled gaming system (e.g., a Microsoft Xbox gaming console with or without a Kinect® gesture input device), and/or a personal messaging device, capable of communicating over a network that can access the VCN 906 and/or the Internet.

The VCN 906 can include a local peering gateway (LPG) 910 that can be communicatively coupled to a secure shell (SSH) VCN 912 via an LPG 910 contained in the SSH VCN 912. The SSH VCN 912 can include an SSH subnet 914, and the SSH VCN 912 can be communicatively coupled to a control plane VCN 916 via the LPG 910 contained in the control plane VCN 916. Also, the SSH VCN 912 can be communicatively coupled to a data plane VCN 918 via an LPG 910. The control plane VCN 916 and the data plane VCN 918 can be contained in a service tenancy 919 that can be owned and/or operated by the IaaS provider.

The control plane VCN 916 can include a control plane demilitarized zone (DMZ) tier 920 that acts as a perimeter network (e.g., portions of a corporate network between the corporate intranet and external networks). The DMZ-based servers may have restricted responsibilities and help keep breaches contained. Additionally, the DMZ tier 920 can include one or more load balancer (LB) subnet(s) 922, a control plane app tier 924 that can include app subnet(s) 926, a control plane data tier 928 that can include database (DB) subnet(s) 930 (e.g., frontend DB subnet(s) and/or backend DB subnet(s)). The LB subnet(s) 922 contained in the control plane DMZ tier 920 can be communicatively coupled to the app subnet(s) 926 contained in the control plane app tier 924 and an Internet gateway 934 that can be contained in the control plane VCN 916, and the app subnet(s) 926 can be communicatively coupled to the DB subnet(s) 930 contained in the control plane data tier 928 and a service gateway 936 and a network address translation (NAT) gateway 938. The control plane VCN 916 can include the service gateway 936 and the NAT gateway 938.

The control plane VCN 916 can include a data plane mirror app tier 940 that can include app subnet(s) 926. The app subnet(s) 926 contained in the data plane mirror app tier 940 can include a virtual network interface controller (VNIC) 942 that can execute a compute instance 944. The compute instance 944 can communicatively couple the app subnet(s) 926 of the data plane mirror app tier 940 to app subnet(s) 926 that can be contained in a data plane app tier 946.

The data plane VCN 918 can include the data plane app tier 946, a data plane DMZ tier 948, and a data plane data tier 950. The data plane DMZ tier 948 can include LB subnet(s) 922 that can be communicatively coupled to the app subnet(s) 926 of the data plane app tier 946 and the Internet gateway 934 of the data plane VCN 918. The app subnet(s) 926 can be communicatively coupled to the service gateway 936 of the data plane VCN 918 and the NAT gateway 938 of the data plane VCN 918. The data plane data tier 950 can also include the DB subnet(s) 930 that can be communicatively coupled to the app subnet(s) 926 of the data plane app tier 946.

The Internet gateway 934 of the control plane VCN 916 and of the data plane VCN 918 can be communicatively coupled to a metadata management service 952 that can be communicatively coupled to public Internet 954. Public Internet 954 can be communicatively coupled to the NAT gateway 938 of the control plane VCN 916 and of the data plane VCN 918. The service gateway 936 of the control plane VCN 916 and of the data plane VCN 918 can be communicatively couple to cloud services 956.

In some examples, the service gateway 936 of the control plane VCN 916 or of the data plane VCN 918 can make application programming interface (API) calls to cloud services 956 without going through public Internet 954. The API calls to cloud services 956 from the service gateway 936 can be one-way: the service gateway 936 can make API calls to cloud services 956, and cloud services 956 can send requested data to the service gateway 936. But, cloud services 956 may not initiate API calls to the service gateway 936.

In some examples, the secure host tenancy 904 can be directly connected to the service tenancy 919, which may be otherwise isolated. The secure host subnet 908 can communicate with the SSH subnet 914 through an LPG 910 that may enable two-way communication over an otherwise isolated system. Connecting the secure host subnet 908 to the SSH subnet 914 may give the secure host subnet 908 access to other entities within the service tenancy 919.

The control plane VCN 916 may allow users of the service tenancy 919 to set up or otherwise provision desired resources. Desired resources provisioned in the control plane VCN 916 may be deployed or otherwise used in the data plane VCN 918. In some examples, the control plane VCN 916 can be isolated from the data plane VCN 918, and the data plane mirror app tier 940 of the control plane VCN 916 can communicate with the data plane app tier 946 of the data plane VCN 918 via VNICs 942 that can be contained in the data plane mirror app tier 940 and the data plane app tier 946.

In some examples, users of the system, or customers, can make requests, for example create, read, update, or delete (CRUD) operations, through public Internet 954 that can communicate the requests to the metadata management service 952. The metadata management service 952 can communicate the request to the control plane VCN 916 through the Internet gateway 934. The request can be received by the LB subnet(s) 922 contained in the control plane DMZ tier 920. The LB subnet(s) 922 may determine that the request is valid, and in response to this determination, the LB subnet(s) 922 can transmit the request to app subnet(s) 926 contained in the control plane app tier 924. If the request is validated and requires a call to public Internet 954, the call to public Internet 954 may be transmitted to the NAT gateway 938 that can make the call to public Internet 954. Memory that may be desired to be stored by the request can be stored in the DB subnet(s) 930.

In some examples, the data plane mirror app tier 940 can facilitate direct communication between the control plane VCN 916 and the data plane VCN 918. For example, changes, updates, or other suitable modifications to configuration may be desired to be applied to the resources contained in the data plane VCN 918. Via a VNIC 942, the control plane VCN 916 can directly communicate with, and can thereby execute the changes, updates, or other suitable modifications to configuration to, resources contained in the data plane VCN 918.

In some embodiments, the control plane VCN 916 and the data plane VCN 918 can be contained in the service tenancy 919. In this case, the user, or the customer, of the system may not own or operate either the control plane VCN 916 or the data plane VCN 918. Instead, the IaaS provider may own or operate the control plane VCN 916 and the data plane VCN 918, both of which may be contained in the service tenancy 919. This embodiment can enable isolation of networks that may prevent users or customers from interacting with other users', or other customers', resources. Also, this embodiment may allow users or customers of the system to store databases privately without needing to rely on public Internet 954, which may not have a desired level of security, for storage.

In other embodiments, the LB subnet(s) 922 contained in the control plane VCN 916 can be configured to receive a signal from the service gateway 936. In this embodiment, the control plane VCN 916 and the data plane VCN 918 may be configured to be called by a customer of the IaaS provider without calling public Internet 954. Customers of the IaaS provider may desire this embodiment since database(s) that the customers use may be controlled by the IaaS provider and may be stored on the service tenancy 919, which may be isolated from public Internet 954.

Figure 10:
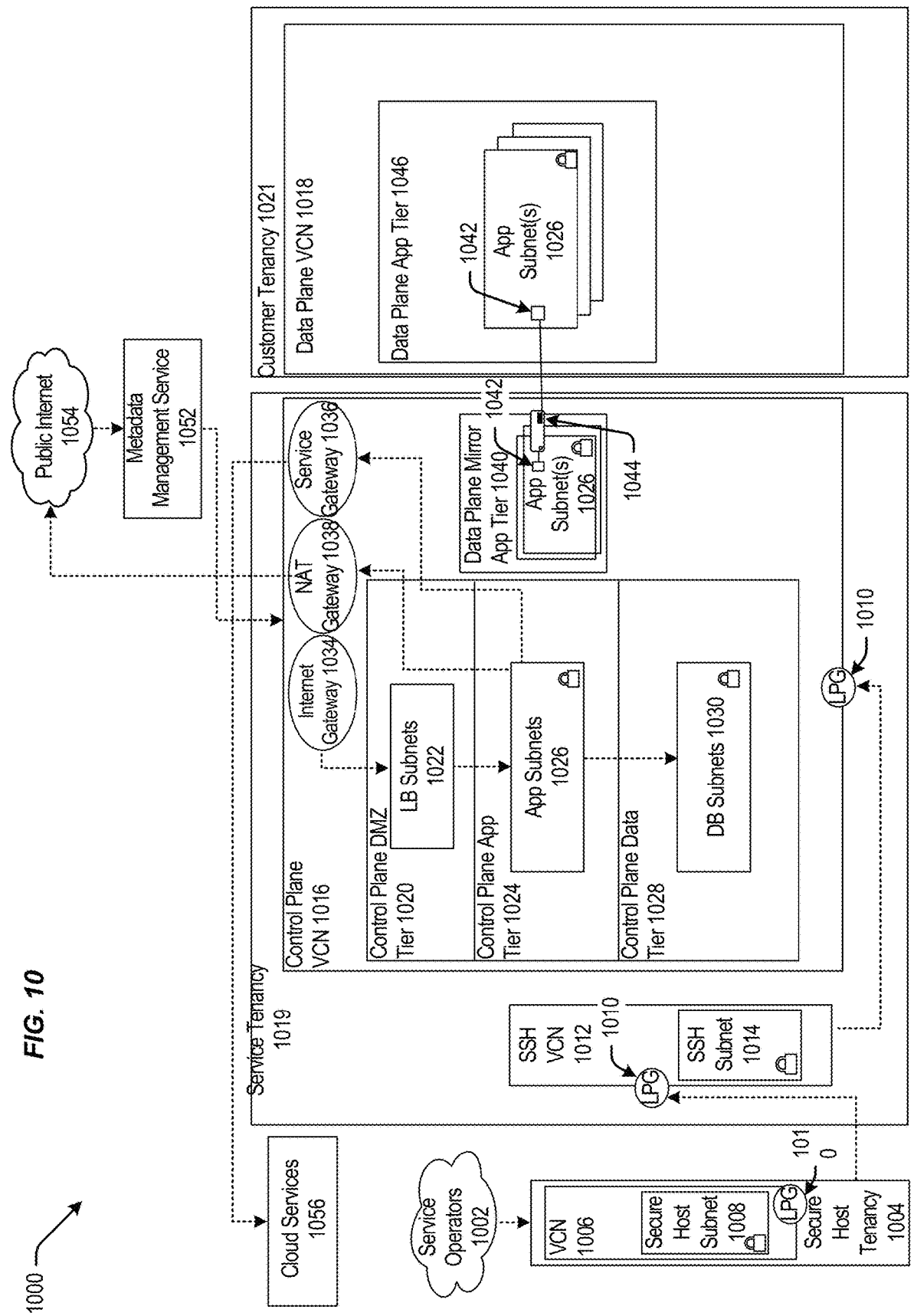
FIG. 10 is a block diagram illustrating another pattern for implementing a cloud infrastructure as a service system, according to at least one embodiment.

FIG. 10 is a block diagram 1000 illustrating another example pattern of an IaaS architecture, according to at least one embodiment. Service operators 1002 (e.g. service operators 902 of FIG. 9) can be communicatively coupled to a secure host tenancy 1004 (e.g. the secure host tenancy 904 of FIG. 9) that can include a virtual cloud network (VCN) 1006 (e.g. the VCN 906 of FIG. 9) and a secure host subnet 1008 (e.g. the secure host subnet 908 of FIG. 9). The VCN 1006 can include a local peering gateway (LPG) 1010 (e.g. the LPG 910 of FIG. 9) that can be communicatively coupled to a secure shell (SSH) VCN 1012 (e.g. the SSH VCN 912 of FIG. 9) via an LPG 910 contained in the SSH VCN 1012. The SSH VCN 1012 can include an SSH subnet 1014 (e.g. the SSH subnet 914 of FIG. 9), and the SSH VCN 1012 can be communicatively coupled to a control plane VCN 1016 (e.g. the control plane VCN 916 of FIG. 9) via an LPG 1010 contained in the control plane VCN 1016. The control plane VCN 1016 can be contained in a service tenancy 1019 (e.g. the service tenancy 919 of FIG. 9), and the data plane VCN 1018 (e.g. the data plane VCN 918 of FIG. 9) can be contained in a customer tenancy 1021 that may be owned or operated by users, or customers, of the system.

The control plane VCN 1016 can include a control plane DMZ tier 1020 (e.g. the control plane DMZ tier 920 of FIG. 9) that can include LB subnet(s) 1022 (e.g. LB subnet(s) 922 of FIG. 9), a control plane app tier 1024 (e.g. the control plane app tier 924 of FIG. 9) that can include app subnet(s) 1026 (e.g. app subnet(s) 926 of FIG. 9), a control plane data tier 1028 (e.g. the control plane data tier 928 of FIG. 9) that can include database (DB) subnet(s) 1030 (e.g. similar to DB subnet(s) 930 of FIG. 9). The LB subnet(s) 1022 contained in the control plane DMZ tier 1020 can be communicatively coupled to the app subnet(s) 1026 contained in the control plane app tier 1024 and an Internet gateway 1034 (e.g. the Internet gateway 934 of FIG. 9) that can be contained in the control plane VCN 1016, and the app subnet(s) 1026 can be communicatively coupled to the DB subnet(s) 1030 contained in the control plane data tier 1028 and a service gateway 1036 (e.g. the service gateway of FIG. 9) and a network address translation (NAT) gateway 1038 (e.g. the NAT gateway 938 of FIG. 9). The control plane VCN 1016 can include the service gateway 1036 and the NAT gateway 1038.

The control plane VCN 1016 can include a data plane mirror app tier 1040 (e.g. the data plane mirror app tier 940 of FIG. 9) that can include app subnet(s) 1026. The app subnet(s) 1026 contained in the data plane mirror app tier 1040 can include a virtual network interface controller (VNIC) 1042 (e.g. the VNIC of 942) that can execute a compute instance 1044 (e.g. similar to the compute instance 944 of FIG. 9). The compute instance 1044 can facilitate communication between the app subnet(s) 1026 of the data plane mirror app tier 1040 and the app subnet(s) 1026 that can be contained in a data plane app tier 1046 (e.g. the data plane app tier 946 of FIG. 9) via the VNIC 1042 contained in the data plane mirror app tier 1040 and the VNIC 1042 contained in the data plane app tier 1046.

The Internet gateway 1034 contained in the control plane VCN 1016 can be communicatively coupled to a metadata management service 1052 (e.g. the metadata management service 952 of FIG. 9) that can be communicatively coupled to public Internet 1054 (e.g. public Internet 954 of FIG. 9). Public Internet 1054 can be communicatively coupled to the NAT gateway 1038 contained in the control plane VCN 1016. The service gateway 1036 contained in the control plane VCN 1016 can be communicatively couple to cloud services 1056 (e.g. cloud services 956 of FIG. 9).

In some examples, the data plane VCN 1018 can be contained in the customer tenancy 1021. In this case, the IaaS provider may provide the control plane VCN 1016 for each customer, and the IaaS provider may, for each customer, set up a unique compute instance 1044 that is contained in the service tenancy 1019. Each compute instance 1044 may allow communication between the control plane VCN 1016, contained in the service tenancy 1019, and the data plane VCN 1018 that is contained in the customer tenancy 1021. The compute instance 1044 may allow resources that are provisioned in the control plane VCN 1016 that is contained in the service tenancy 1019, to be deployed or otherwise used in the data plane VCN 1018 that is contained in the customer tenancy 1021.

In other examples, the customer of the IaaS provider may have databases that live in the customer tenancy 1021. In this example, the control plane VCN 1016 can include the data plane mirror app tier 1040 that can include app subnet(s) 1026. The data plane mirror app tier 1040 can reside in the data plane VCN 1018, but the data plane mirror app tier 1040 may not live in the data plane VCN 1018. That is, the data plane mirror app tier 1040 may have access to the customer tenancy 1021, but the data plane mirror app tier 1040 may not exist in the data plane VCN 1018 or be owned or operated by the customer of the IaaS provider. The data plane mirror app tier 1040 may be configured to make calls to the data plane VCN 1018 but may not be configured to make calls to any entity contained in the control plane VCN 1016. The customer may desire to deploy or otherwise use resources in the data plane VCN 1018 that are provisioned in the control plane VCN 1016, and the data plane mirror app tier 1040 can facilitate the desired deployment, or other usage of resources, of the customer.

In some embodiments, the customer of the IaaS provider can apply filters to the data plane VCN 1018. In this embodiment, the customer can determine what the data plane VCN 1018 can access, and the customer may restrict access to public Internet 1054 from the data plane VCN 1018. The IaaS provider may not be able to apply filters or otherwise control access of the data plane VCN 1018 to any outside networks or databases. Applying filters and controls by the customer onto the data plane VCN 1018, contained in the customer tenancy 1021, can help isolate the data plane VCN 1018 from other customers and from public Internet 1054.

In some embodiments, cloud services 1056 can be called by the service gateway 1036 to access services that may not exist on public Internet 1054, on the control plane VCN 1016, or on the data plane VCN 1018. The connection between cloud services 1056 and the control plane VCN 1016 or the data plane VCN 1018 may not be live or continuous. Cloud services 1056 may exist on a different network owned or operated by the IaaS provider. Cloud services 1056 may be configured to receive calls from the service gateway 1036 and may be configured to not receive calls from public Internet 1054. Some cloud services 1056 may be isolated from other cloud services 1056, and the control plane VCN 1016 may be isolated from cloud services 1056 that may not be in the same region as the control plane VCN 1016. For example, the control plane VCN 1016 may be located in "Region 1," and cloud service "Deployment 8," may be located in Region 1 and in "Region 2." If a call to Deployment 8 is made by the service gateway 1036 contained in the control plane VCN 1016 located in Region 1, the call may be transmitted to Deployment 8 in Region 1. In this example, the control plane VCN 1016, or Deployment 8 in Region 1, may not be communicatively coupled to, or otherwise in communication with, Deployment 8 in Region 2.

Figure 11:
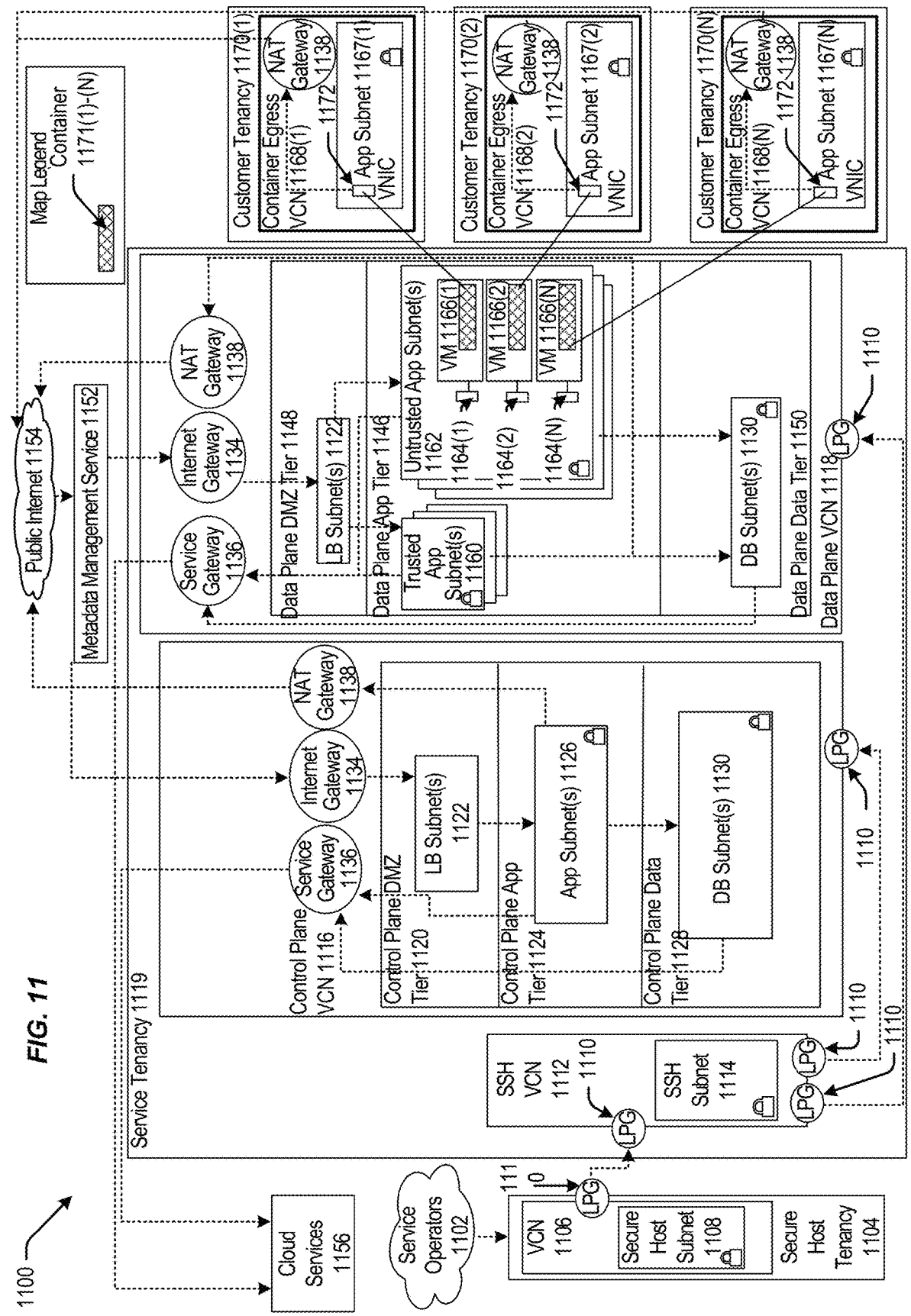
FIG. 11 is a block diagram illustrating another pattern for implementing a cloud infrastructure as a service system, according to at least one embodiment.

FIG. 11 is a block diagram 1100 illustrating another example pattern of an IaaS architecture, according to at least one embodiment. Service operators 1102 (e.g. service operators 902 of FIG. 9) can be communicatively coupled to a secure host tenancy 1104 (e.g. the secure host tenancy 904 of FIG. 9) that can include a virtual cloud network (VCN) 1106 (e.g. the VCN 906 of FIG. 9) and a secure host subnet 1108 (e.g. the secure host subnet 908 of FIG. 9). The VCN 1106 can include an LPG 1110 (e.g. the LPG 910 of FIG. 9) that can be communicatively coupled to an SSH VCN 1112 (e.g. the SSH VCN 912 of FIG. 9) via an LPG 1110 contained in the SSH VCN 1112. The SSH VCN 1112 can include an SSH subnet 1114 (e.g. the SSH subnet 914 of FIG. 9), and the SSH VCN 1112 can be communicatively coupled to a control plane VCN 1116 (e.g. the control plane VCN 916 of FIG. 9) via an LPG 1110 contained in the control plane VCN 1116 and to a data plane VCN 1118 (e.g. the data plane 918 of FIG. 9) via an LPG 1110 contained in the data plane VCN 1118. The control plane VCN 1116 and the data plane VCN 1118 can be contained in a service tenancy 1119 (e.g. the service tenancy 919 of FIG. 9).

The control plane VCN 1116 can include a control plane DMZ tier 1120 (e.g. the control plane DMZ tier 920 of FIG. 9) that can include load balancer (LB) subnet(s) 1122 (e.g. LB subnet(s) 922 of FIG. 9), a control plane app tier 1124 (e.g. the control plane app tier 924 of FIG. 9) that can include app subnet(s) 1126 (e.g. similar to app subnet(s) 926 of FIG. 9), a control plane data tier 1128 (e.g. the control plane data tier 928 of FIG. 9) that can include DB subnet(s) 1130. The LB subnet(s) 1122 contained in the control plane DMZ tier 1120 can be communicatively coupled to the app subnet(s) 1126 contained in the control plane app tier 1124 and to an Internet gateway 1134 (e.g. the Internet gateway 934 of FIG. 9) that can be contained in the control plane VCN 1116, and the app subnet(s) 1126 can be communicatively coupled to the DB subnet(s) 1130 contained in the control plane data tier 1128 and to a service gateway 1136 (e.g. the service gateway of FIG. 9) and a network address translation (NAT) gateway 1138 (e.g. the NAT gateway 938 of FIG. 9). The control plane VCN 1116 can include the service gateway 1136 and the NAT gateway 1138.

The data plane VCN 1118 can include a data plane app tier 1146 (e.g. the data plane app tier 946 of FIG. 9), a data plane DMZ tier 1148 (e.g. the data plane DMZ tier 948 of FIG. 9), and a data plane data tier 1150 (e.g. the data plane data tier 950 of FIG. 9). The data plane DMZ tier 1148 can include LB subnet(s) 1122 that can be communicatively coupled to trusted app subnet(s) 1160 and untrusted app subnet(s) 1162 of the data plane app tier 1146 and the Internet gateway 1134 contained in the data plane VCN 1118. The trusted app subnet(s) 1160 can be communicatively coupled to the service gateway 1136 contained in the data plane VCN 1118, the NAT gateway 1138 contained in the data plane VCN 1118, and DB subnet(s) 1130 contained in the data plane data tier 1150. The untrusted app subnet(s) 1162 can be communicatively coupled to the service gateway 1136 contained in the data plane VCN 1118 and DB subnet(s) 1130 contained in the data plane data tier 1150. The data plane data tier 1150 can include DB subnet(s) 1130 that can be communicatively coupled to the service gateway 1136 contained in the data plane VCN 1118.

The untrusted app subnet(s) 1162 can include one or more primary VNICs 1164(1)-(N) that can be communicatively coupled to tenant virtual machines (VMs) 1166(1)-(N). Each tenant VM 1166(1)-(N) can be communicatively coupled to a respective app subnet 1167(1)-(N) that can be contained in respective container egress VCNs 1168(1)-(N) that can be contained in respective customer tenancies 1170(1)-(N). Respective secondary VNICs 1172(1)-(N) can facilitate communication between the untrusted app subnet(s) 1162 contained in the data plane VCN 1118 and the app subnet contained in the container egress VCNs 1168(1)-(N). Each container egress VCNs 1168(1)-(N) can include a NAT gateway 1138 that can be communicatively coupled to public Internet 1154 (e.g. public Internet 954 of FIG. 9).

The Internet gateway 1134 contained in the control plane VCN 1116 and contained in the data plane VCN 1118 can be communicatively coupled to a metadata management service 1152 (e.g. the metadata management system 952 of FIG. 9) that can be communicatively coupled to public Internet 1154. Public Internet 1154 can be communicatively coupled to the NAT gateway 1138 contained in the control plane VCN 1116 and contained in the data plane VCN 1118. The service gateway 1136 contained in the control plane VCN 1116 and contained in the data plane VCN 1118 can be communicatively couple to cloud services 1156.

In some embodiments, the data plane VCN 1118 can be integrated with customer tenancies 1170. This integration can be useful or desirable for customers of the IaaS provider in some cases such as a case that may desire support when executing code. The customer may provide code to run that may be destructive, may communicate with other customer resources, or may otherwise cause undesirable effects. In response to this, the IaaS provider may determine whether to run code given to the IaaS provider by the customer.

In some examples, the customer of the IaaS provider may grant temporary network access to the IaaS provider and request a function to be attached to the data plane tier app 1146. Code to run the function may be executed in the VMs 1166(1)-(N), and the code may not be configured to run anywhere else on the data plane VCN 1118. Each VM 1166(1)-(N) may be connected to one customer tenancy 1170. Respective containers 1171(1)-(N) contained in the VMs 1166(1)-(N) may be configured to run the code. In this case, there can be a dual isolation (e.g., the containers 1171(1)-(N) running code, where the containers 1171(1)-(N) may be contained in at least the VM 1166(1)-(N) that are contained in the untrusted app subnet(s) 1162), which may help prevent incorrect or otherwise undesirable code from damaging the network of the IaaS provider or from damaging a network of a different customer. The containers 1171(1)-(N) may be communicatively coupled to the customer tenancy 1170 and may be configured to transmit or receive data from the customer tenancy 1170. The containers 1171(1)-(N) may not be configured to transmit or receive data from any other entity in the data plane VCN 1118. Upon completion of running the code, the IaaS provider may kill or otherwise dispose of the containers 1171(1)-(N).

In some embodiments, the trusted app subnet(s) 1160 may run code that may be owned or operated by the IaaS provider. In this embodiment, the trusted app subnet(s) 1160 may be communicatively coupled to the DB subnet(s) 1130 and be configured to execute CRUD operations in the DB subnet(s) 1130. The untrusted app subnet(s) 1162 may be communicatively coupled to the DB subnet(s) 1130, but in this embodiment, the untrusted app subnet(s) may be configured to execute read operations in the DB subnet(s) 1130. The containers 1171(1)-(N) that can be contained in the VM 1166(1)-(N) of each customer and that may run code from the customer may not be communicatively coupled with the DB subnet(s) 1130.

In other embodiments, the control plane VCN 1116 and the data plane VCN 1118 may not be directly communicatively coupled. In this embodiment, there may be no direct communication between the control plane VCN 1116 and the data plane VCN 1118. However, communication can occur indirectly through at least one method. An LPG 1110 may be established by the IaaS provider that can facilitate communication between the control plane VCN 1116 and the data plane VCN 1118. In another example, the control plane VCN 1116 or the data plane VCN 1118 can make a call to cloud services 1156 via the service gateway 1136. For example, a call to cloud services 1156 from the control plane VCN 1116 can include a request for a service that can communicate with the data plane VCN 1118.

Figure 12:
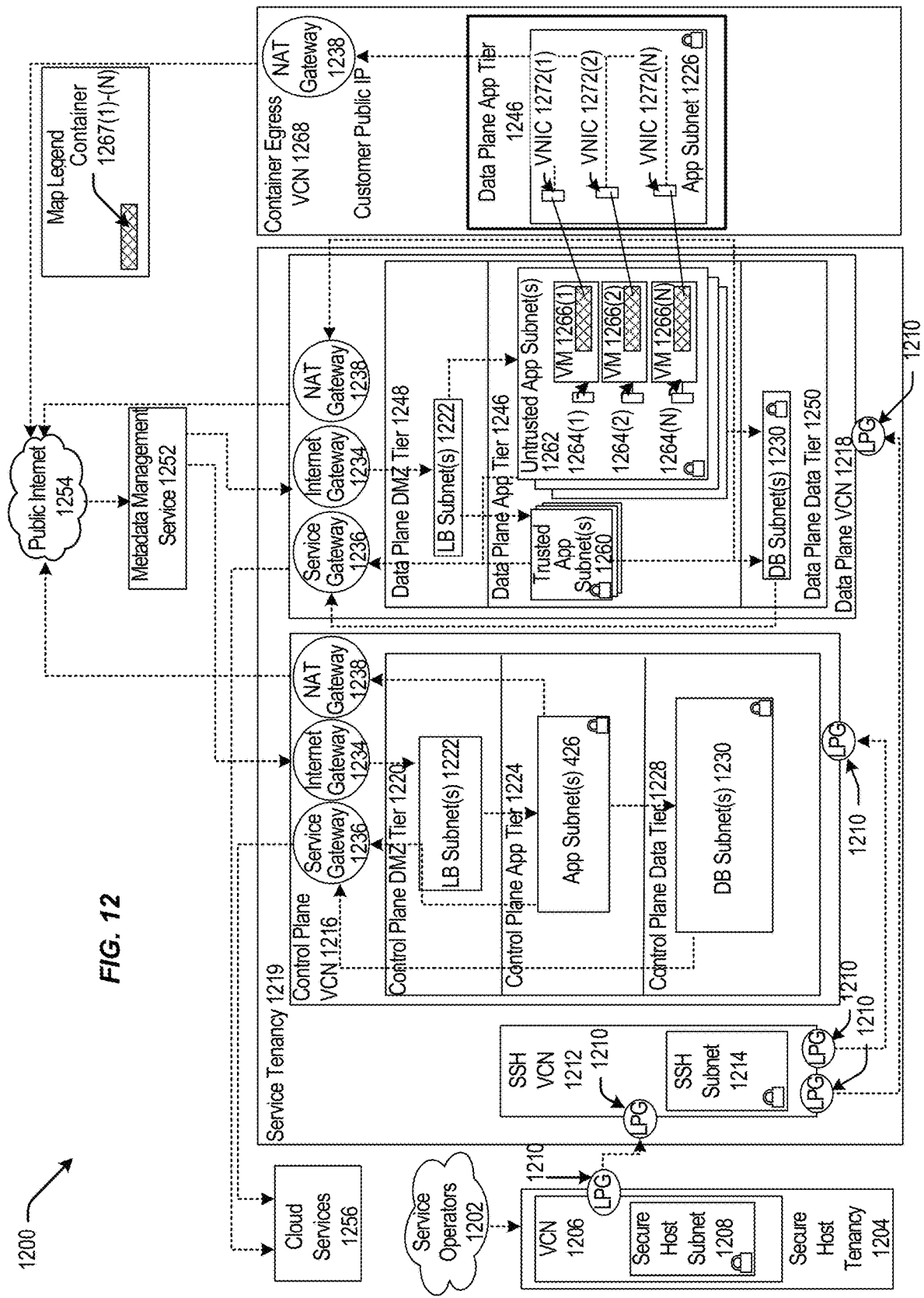
FIG. 12 is a block diagram illustrating another pattern for implementing a cloud infrastructure as a service system, according to at least one embodiment.

FIG. 12 is a block diagram 1200 illustrating another example pattern of an IaaS architecture, according to at least one embodiment. Service operators 1202 (e.g. service operators 902 of FIG. 9) can be communicatively coupled to a secure host tenancy 1204 (e.g. the secure host tenancy 904 of FIG. 9) that can include a virtual cloud network (VCN) 1206 (e.g. the VCN 906 of FIG. 9) and a secure host subnet 1208 (e.g. the secure host subnet 908 of FIG. 9). The VCN 1206 can include an LPG 1210 (e.g. the LPG 910 of FIG. 9) that can be communicatively coupled to an SSH VCN 1212 (e.g. the SSH VCN 912 of FIG. 9) via an LPG 1210 contained in the SSH VCN 1212. The SSH VCN 1212 can include an SSH subnet 1214 (e.g. the SSH subnet 914 of FIG. 9), and the SSH VCN 1212 can be communicatively coupled to a control plane VCN 1216 (e.g. the control plane VCN 916 of FIG. 9) via an LPG 1210 contained in the control plane VCN 1216 and to a data plane VCN 1218 (e.g. the data plane 918 of FIG. 9) via an LPG 1210 contained in the data plane VCN 1218. The control plane VCN 1216 and the data plane VCN 1218 can be contained in a service tenancy 1219 (e.g. the service tenancy 919 of FIG. 9).

The control plane VCN 1216 can include a control plane DMZ tier 1220 (e.g. the control plane DMZ tier 920 of FIG. 9) that can include LB subnet(s) 1222 (e.g. LB subnet(s) 922 of FIG. 9), a control plane app tier 1224 (e.g. the control plane app tier 924 of FIG. 9) that can include app subnet(s) 1226 (e.g. app subnet(s) 926 of FIG. 9), a control plane data tier 1228 (e.g. the control plane data tier 928 of FIG. 9) that can include DB subnet(s) 1230 (e.g. DB subnet(s) 1130 of FIG. 11). The LB subnet(s) 1222 contained in the control plane DMZ tier 1220 can be communicatively coupled to the app subnet(s) 1226 contained in the control plane app tier 1224 and to an Internet gateway 1234 (e.g. the Internet gateway 934 of FIG. 9) that can be contained in the control plane VCN 1216, and the app subnet(s) 1226 can be communicatively coupled to the DB subnet(s) 1230 contained in the control plane data tier 1228 and to a service gateway 1236 (e.g. the service gateway of FIG. 9) and a network address translation (NAT) gateway 1238 (e.g. the NAT gateway 938 of FIG. 9). The control plane VCN 1216 can include the service gateway 1236 and the NAT gateway 1238.

The data plane VCN 1218 can include a data plane app tier 1246 (e.g. the data plane app tier 946 of FIG. 9), a data plane DMZ tier 1248 (e.g. the data plane DMZ tier 948 of FIG. 9), and a data plane data tier 1250 (e.g. the data plane data tier 950 of FIG. 9). The data plane DMZ tier 1248 can include LB subnet(s) 1222 that can be communicatively coupled to trusted app subnet(s) 1260 (e.g. trusted app subnet(s) 1160 of FIG. 11) and untrusted app subnet(s) 1262 (e.g. untrusted app subnet(s) 1162 of FIG. 11) of the data plane app tier 1246 and the Internet gateway 1234 contained in the data plane VCN 1218. The trusted app subnet(s) 1260 can be communicatively coupled to the service gateway 1236 contained in the data plane VCN 1218, the NAT gateway 1238 contained in the data plane VCN 1218, and DB subnet(s) 1230 contained in the data plane data tier 1250. The untrusted app subnet(s) 1262 can be communicatively coupled to the service gateway 1236 contained in the data plane VCN 1218 and DB subnet(s) 1230 contained in the data plane data tier 1250. The data plane data tier 1250 can include DB subnet(s) 1230 that can be communicatively coupled to the service gateway 1236 contained in the data plane VCN 1218.

The untrusted app subnet(s) 1262 can include primary VNICs 1264(1)-(N) that can be communicatively coupled to tenant virtual machines (VMs) 1266(1)-(N) residing within the untrusted app subnet(s) 1262. Each tenant VM 1266(1)-(N) can run code in a respective container 1267(1)-(N), and be communicatively coupled to an app subnet 1226 that can be contained in a data plane app tier 1246 that can be contained in a container egress VCN 1268. Respective secondary VNICs 1272(1)-(N) can facilitate communication between the untrusted app subnet(s) 1262 contained in the data plane VCN 1218 and the app subnet contained in the container egress VCN 1268. The container egress VCN can include a NAT gateway 1238 that can be communicatively coupled to public Internet 1254 (e.g. public Internet 954 of FIG. 9).

The Internet gateway 1234 contained in the control plane VCN 1216 and contained in the data plane VCN 1218 can be communicatively coupled to a metadata management service 1252 (e.g. the metadata management system 952 of FIG. 9) that can be communicatively coupled to public Internet 1254. Public Internet 1254 can be communicatively coupled to the NAT gateway 1238 contained in the control plane VCN 1216 and contained in the data plane VCN 1218. The service gateway 1236 contained in the control plane VCN 1216 and contained in the data plane VCN 1218 can be communicatively couple to cloud services 1256.

In some examples, the pattern illustrated by the architecture of block diagram 1200 of FIG. 12 may be considered an exception to the pattern illustrated by the architecture of block diagram 1100 of FIG. 11 and may be desirable for a customer of the IaaS provider if the IaaS provider cannot directly communicate with the customer (e.g., a disconnected region). The respective containers 1267(1)-(N) that are contained in the VMs 1266(1)-(N) for each customer can be accessed in real-time by the customer. The containers 1267(1)-(N) may be configured to make calls to respective secondary VNICs 1272(1)-(N) contained in app subnet(s) 1226 of the data plane app tier 1246 that can be contained in the container egress VCN 1268. The secondary VNICs 1272(1)-(N) can transmit the calls to the NAT gateway 1238 that may transmit the calls to public Internet 1254. In this example, the containers 1267(1)-(N) that can be accessed in real-time by the customer can be isolated from the control plane VCN 1216 and can be isolated from other entities contained in the data plane VCN 1218. The containers 1267(1)-(N) may also be isolated from resources from other customers.

In other examples, the customer can use the containers 1267(1)-(N) to call cloud services 1256. In this example, the customer may run code in the containers 1267(1)-(N) that requests a service from cloud services 1256. The containers 1267(1)-(N) can transmit this request to the secondary VNICs 1272(1)-(N) that can transmit the request to the NAT gateway that can transmit the request to public Internet 1254. Public Internet 1254 can transmit the request to LB subnet(s) 1222 contained in the control plane VCN 1216 via the Internet gateway 1234. In response to determining the request is valid, the LB subnet(s) can transmit the request to app subnet(s) 1226 that can transmit the request to cloud services 1256 via the service gateway 1236.

It should be appreciated that IaaS architectures 900, 1000, 1100, 1200 depicted in the figures may have other components than those depicted. Further, the embodiments shown in the figures are only some examples of a cloud infrastructure system that may incorporate an embodiment of the disclosure. In some other embodiments, the IaaS systems may have more or fewer components than shown in the figures, may combine two or more components, or may have a different configuration or arrangement of components.

In certain embodiments, the IaaS systems described herein may include a suite of applications, middleware, and database service offerings that are delivered to a customer in a self-service, subscription-based, elastically scalable, reliable, highly available, and secure manner. An example of such an IaaS system is the Oracle Cloud Infrastructure (OCI) provided by the present assignee.

Figure 13:
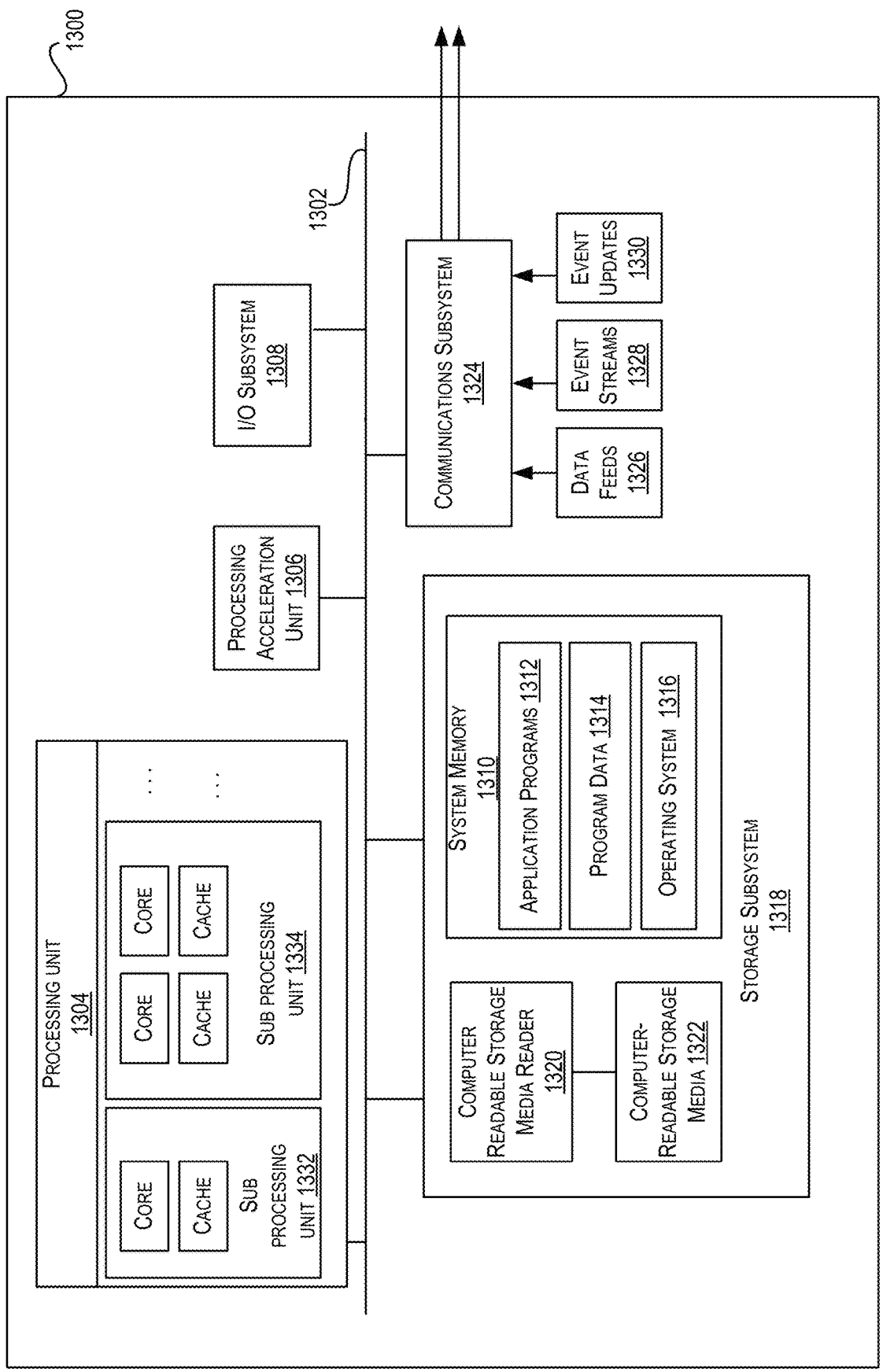
FIG. 13 is a block diagram illustrating an example computer system, according to at least one embodiment.

FIG. 13 illustrates an example computer system 1300, in which various embodiments may be implemented. The system 1300 may be used to implement any of the computer systems described above. As shown in the figure, computer system 1300 includes a processing unit 1304 that communicates with a number of peripheral subsystems via a bus subsystem 1302. These peripheral subsystems may include a processing acceleration unit 1306, an I/O subsystem 1308, a storage subsystem 1318 and a communications subsystem 1324. Storage subsystem 1318 includes tangible computer-readable storage media 1322 and a system memory 1310.

Bus subsystem 1302 provides a mechanism for letting the various components and subsystems of computer system

1300 communicate with each other as intended. Although bus subsystem 1302 is shown schematically as a single bus, alternative embodiments of the bus subsystem may utilize multiple buses. Bus subsystem 1302 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 1304, which can be implemented as one or more integrated circuits (e.g., a conventional microprocessor or microcontroller), controls the operation of computer system 1300. One or more processors may be included in processing unit 1304. These processors may include single core or multicore processors. In certain embodiments, processing unit 1304 may be implemented as one or more independent processing units 1332 and/or 1334 with single or multicore processors included in each processing unit. In other embodiments, processing unit 1304 may also be implemented as a quad-core processing unit formed by integrating two dual-core processors into a single chip.

In various embodiments, processing unit 1304 can execute a variety of programs in response to program code and can maintain multiple concurrently executing programs or processes. At any given time, some or all of the program code to be executed can be resident in processor(s) 1304 and/or in storage subsystem 1318. Through suitable programming, processor(s) 1304 can provide various functionalities described above. Computer system 1300 may additionally include a processing acceleration unit 1306, which can include a digital signal processor (DSP), a special-purpose processor, and/or the like.

I/O subsystem 1308 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1300 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 1300 may comprise a storage subsystem 1318 that comprises software elements, shown as being currently located within a system memory 1310. System memory 1310 may store program instructions that are loadable and executable on processing unit 1304, as well as data generated during the execution of these programs.

Depending on the configuration and type of computer system 1300, system memory 1310 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 1304. In some implementations, system memory 1310 may include multiple different types of memory, such as static random access memory (SRAM) or dynamic random access memory (DRAM). In some implementations, a basic input/output system (BIOS), containing the basic routines that help to transfer information between elements within computer system 1300, such as during start-up, may typically be stored in the ROM. By way of example, and not limitation, system memory 1310 also illustrates application programs 1312, which may include client applications, Web browsers, mid-tier applications, relational database management systems (RDBMS), etc., program data 1314, and an operating system 1316. By way of example, operating system 1316 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 13 OS, and Palm® OS operating systems.

Storage subsystem 1318 may also provide a tangible computer-readable storage medium for storing the basic programming and data constructs that provide the functionality of some embodiments. Software (programs, code modules, instructions) that when executed by a processor provide the functionality described above may be stored in storage subsystem 1318. These software modules or instructions may be executed by processing unit 1304. Storage subsystem 1318 may also provide a repository for storing data used in accordance with the present disclosure.

Storage subsystem 1300 may also include a computer-readable storage media reader 1320 that can further be connected to computer-readable storage media 1322.

Together and, optionally, in combination with system memory 1310, computer-readable storage media 1322 may comprehensively represent remote, local, fixed, and/or removable storage devices plus storage media for temporarily and/or more permanently containing, storing, transmitting, and retrieving computer-readable information.

Computer-readable storage media 1322 containing code, or portions of code, can also include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 1300.

By way of example, computer-readable storage media 1322 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 1322 may include, but is not limited to, Zip® drives, flash memory cards, universal serial bus (USB) flash drives, secure digital (SD) cards, DVD disks, digital video tape, and the like. Computer-readable storage media 1322 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 1300.

Communications subsystem 1324 provides an interface to other computer systems and networks. Communications subsystem 1324 serves as an interface for receiving data from and transmitting data to other systems from computer system 1300. For example, communications subsystem 1324 may enable computer system 1300 to connect to one or more devices via the Internet. In some embodiments communications subsystem 1324 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 1324 can provide wired network connectivity (e.g., Ethernet) in addition to or instead of a wireless interface.

In some embodiments, communications subsystem 1324 may also receive input communication in the form of structured and/or unstructured data feeds 1326, event streams 1328, event updates 1330, and the like on behalf of one or more users who may use computer system 1300.

By way of example, communications subsystem 1324 may be configured to receive data feeds 1326 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 1324 may also be configured to receive data in the form of continuous data streams, which may include event streams 1328 of real-time events and/or event updates 1330, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 1324 may also be configured to output the structured and/or unstructured data feeds 1326, event streams 1328, event updates 1330, and the like to one or more databases that may be in communication with one or more streaming data source computers coupled to computer system 1300.

Computer system 1300 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 1300 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

Although specific embodiments have been described, various modifications, alterations, alternative constructions, and equivalents are also encompassed within the scope of the disclosure. Embodiments are not restricted to operation within certain specific data processing environments, but are free to operate within a plurality of data processing environments. Additionally, although embodiments have been described using a particular series of transactions and steps, it should be apparent to those skilled in the art that the scope of the present disclosure is not limited to the described series of transactions and steps. Various features and aspects of the above-described embodiments may be used individually or jointly.

Further, while embodiments have been described using a particular combination of hardware and software, it should be recognized that other combinations of hardware and software are also within the scope of the present disclosure. Embodiments may be implemented only in hardware, or only in software, or using combinations thereof. The various processes described herein can be implemented on the same processor or different processors in any combination. Accordingly, where components or modules are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for inter process communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific disclosure embodiments have been described, these are not intended to be limiting. Various modifications and equivalents are within the scope of the following claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known for carrying out the disclosure. Variations of those preferred embodiments may become apparent to those of ordinary skill in the art upon reading the foregoing description. Those of ordinary skill should be able to employ such variations as appropriate and the disclosure may be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein.

All references, including publications, patent applications, and patents, cited herein are hereby incorporated by reference to the same extent as if each reference were individually and specifically indicated to be incorporated by reference and were set forth in its entirety herein.

In the foregoing specification, aspects of the disclosure are described with reference to specific embodiments thereof, but those skilled in the art will recognize that the disclosure is not limited thereto. Various features and aspects of the above-described disclosure may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed is:

1. A computer-implemented method, comprising:
   obtaining, by a computing device, a set of connectivity paths of a containerized environment, the set of connectivity paths individually indicating connections between pairs of containers in the containerized environment;
   identifying, by the computing device, a first container and a second container of a pair of containers based at least in part on a connectivity path of the set of connectivity paths;
   determining, by the computing device, a network policy corresponding to the connectivity path, the network policy indicating an expected result of a particular connection between the first container and the second container;
   initializing, by the computing device, a connection from the first container to the second container;
   identifying, by the computing device, a result of the connection; and
   causing the result to be presented at a user device based at least in part on identifying that the result is different from the expected result indicated by the network policy corresponding to the connectivity path.

2. The computer-implemented method of claim 1, wherein the result indicates that the connection was established or that establishing the connection failed.

3. The computer-implemented method of claim 1, further comprising:
   identifying a first subset of connectivity paths of the set of connectivity paths as positive paths based at least in part to one or more network policies that individually correspond with a respective connectivity path of the first subset of connectivity paths, wherein identifying a particular connectivity path as a positive path comprising determining that connection between two containers of the connectivity path is to be allowed based at least in part on a corresponding network policy; and
   generating a second subset of connectivity paths of the set of connectivity paths, the second subset of connectivity paths corresponding to negative paths, the second subset of connectivity paths being generated based at least in part on identifying the first subset of connectivity paths.

4. The computer-implemented method of claim 1, wherein obtaining the set of connectivity paths further comprises, for at least one connectivity path of the set of connectivity paths:
   monitoring, at run-time, network traffic between two containers of the containerized environment; and
   generating a corresponding connectivity path based at least in part on the monitoring.

5. The computer-implemented method of claim 1, wherein obtaining the set of connectivity paths further comprises, for at least one connectivity path of the set of connectivity paths, obtaining a predefined connectivity path indicating that a specific connection between a specific pair of containers is to be allowed or disallowed.

6. The computer-implemented method of claim 1, further comprising identifying the first container and the second container based at least in part on identifying the first container is associated with a first label and the second container is associated with a second label.

7. The computer-implemented method of claim 6, wherein the first container is one of a plurality of containers associated with the first label, and the method further comprises:
   initiating an additional connection between at least one other container of the plurality of containers and the second container;
   identifying, by the computing device, an additional result of the additional connection; and
   causing the additional result to be presented based at least in part on identifying that the additional result is different from the expected result indicated by the network policy corresponding to the connectivity path.

8. A computing device, comprising:
   a processor; and
   a memory storing instructions that, when executed by the processor, causes the computing device to:
      obtain a set of connectivity paths of a containerized environment, the set of connectivity paths individually indicating connections between pairs of containers in the containerized environment;
      identify a first container and a second container of a pair of containers based at least in part on a connectivity path of the set of connectivity paths;
      determine a network policy corresponding to the connectivity path, the network policy indicating an expected result of a particular connection between the first container and the second container;
      initialize a connection from the first container to the second container;
      identify a result of the connection; and
      cause the result to be presented at a user device based at least in part on identifying that the result is different from the expected result indicated by the network policy corresponding to the connectivity path.

9. The computing device of claim 8, wherein the result indicates that the connection was established or that establishing the connection failed.

10. The computing device of claim 8, wherein executing the instructions further causes the computing device to:
    identifying a first subset of connectivity paths of the set of connectivity paths as positive paths based at least in part to one or more network policies that individually correspond with a respective connectivity path of the first subset of connectivity paths, wherein identifying a particular connectivity path as a positive path comprising determining that connection between two containers of the connectivity path is to be allowed based at least in part on a corresponding network policy; and
    generating a second subset of connectivity paths of the set of connectivity paths, the second subset of connectivity paths corresponding to negative paths, the second subset of connectivity paths being generated based at least in part on identifying the first subset of connectivity paths.

11. The computing device of claim 8, wherein executing the instructions to obtain the set of connectivity paths further causes the computing device to, for at least one connectivity path of the set of connectivity paths:
    monitor, at run-time, network traffic between two containers of the containerized environment; and
    generate a corresponding connectivity path based at least in part on the monitoring.

12. The computing device of claim 8, wherein executing the instructions to obtain the set of connectivity paths further causes the computing device to, for at least one connectivity path of the set of connectivity paths, obtain a predefined connectivity path indicating that a specific connection between a specific pair of containers is to be allowed or disallowed.

13. The computing device of claim 8, wherein executing the instructions further causes the computing device to identify the first container and the second container based at least in part on identifying the first container is associated with a first label and the second container is associated with a second label.

14. The computing device of claim 13, wherein the first container is one of a plurality of containers associated with the first label, and wherein executing the instructions further causes the computing device to:
    initiate an additional connection between at least one other container of the plurality of containers and the second container;
    identify an additional result of the additional connection; and
    cause the additional result to be presented based at least in part on identifying that the additional result is different from the expected result indicated by the network policy corresponding to the connectivity path.

15. A non-transitory computer-readable medium storing computer-executable instructions that, when executed by one or more processors of a computing device, cause the computing device to:
    obtain a set of connectivity paths of a containerized environment, the set of connectivity paths individually indicating connections between pairs of containers in the containerized environment;
    identify a first container and a second container of a pair of containers based at least in part on a connectivity path of the set of connectivity paths;
    determine a network policy corresponding to the connectivity path, the network policy indicating an expected result of a particular connection between the first container and the second container;
    initialize a connection from the first container to the second container;
    identify a result of the connection; and
    cause the result to be presented at a user device based at least in part on identifying that the result is different from the expected result indicated by the network policy corresponding to the connectivity path.

16. The non-transitory computer-readable medium of claim 15, wherein executing the computer-executable instructions further cause the computing device to:
    identify a first subset of connectivity paths of the set of connectivity paths as positive paths based at least in part to one or more network policies that individually correspond with a respective connectivity path of the first subset of connectivity paths, wherein identifying a particular connectivity path as a positive path comprising determining that connection between two containers of the connectivity path is to be allowed based at least in part on a corresponding network policy; and generating a second subset of connectivity paths of the set of connectivity paths, the second subset of connectivity paths corresponding to negative paths, the second subset of connectivity paths being generated based at least in part on identifying the first subset of connectivity paths.

17. The non-transitory computer-readable medium of claim 15, wherein executing the computer-executable instructions to obtain the set of connectivity paths further causes the computing device to, for at least one connectivity path of the set of connectivity paths:

monitor, at run-time, network traffic between two containers of the containerized environment; and generate a corresponding connectivity path based at least in part on the monitoring.

18. The non-transitory computer-readable medium of claim 15, wherein executing the computer-executable instructions to obtain the set of connectivity paths further causes the computing device to, for at least one connectivity path of the set of connectivity paths, obtain a predefined connectivity path indicating that a specific connection between a specific pair of containers is to be allowed or disallowed.

19. The non-transitory computer-readable medium of claim 15, wherein executing the computer-executable instructions further causes the computing device to identify the first container and the second container based at least in part on identifying the first container is associated with a first label and the second container is associated with a second label.

20. The non-transitory computer-readable medium of claim 19, wherein the first container is one of a plurality of containers associated with the first label, and executing the instructions further causes the computing device to:

initiate an additional connection between at least one other container of the plurality of containers and the second container;

identify an additional result of the additional connection; and cause the additional result to be presented based at least in part on identifying that the additional result is different from the expected result indicated by the network policy corresponding to the connectivity path.

* * * * *